US011121984B2

United States Patent
Pelekhaty et al.

(10) Patent No.: US 11,121,984 B2
(45) Date of Patent: Sep. 14, 2021

(54) ROUTING TABLES FOR FORWARDING PACKETS BETWEEN SWITCHES IN A DATA CENTER NETWORK

(71) Applicant: Ciena Corporation, Hanover, MD (US)

(72) Inventors: Vladimir Pelekhaty, Baltimore, MD (US); Michael Y. Frankel, Bethesda, MD (US)

(73) Assignee: Ciena Corporation, Hanover, MD (US)

( * ) Notice: Subject to any disclaimer, the term of this patent is extended or adjusted under 35 U.S.C. 154(b) by 115 days.

(21) Appl. No.: 16/656,783

(22) Filed: Oct. 18, 2019

(65) Prior Publication Data

US 2021/0119938 A1 Apr. 22, 2021

(51) Int. Cl.
*H04L 12/947* (2013.01)
*H04L 12/721* (2013.01)
*H04L 12/707* (2013.01)
*H04L 12/741* (2013.01)
*H04L 12/803* (2013.01)
*H04L 12/841* (2013.01)
*H04L 12/933* (2013.01)

(52) U.S. Cl.
CPC .............. *H04L 49/25* (2013.01); *H04L 45/12* (2013.01); *H04L 45/24* (2013.01); *H04L 45/54* (2013.01); *H04L 45/74* (2013.01); *H04L 47/122* (2013.01); *H04L 47/286* (2013.01); *H04L 49/15* (2013.01)

(58) Field of Classification Search
CPC ......... H04L 49/25; H04L 45/74; H04L 45/24; H04L 45/12; H04L 49/15; H04L 45/54
See application file for complete search history.

(56) References Cited

U.S. PATENT DOCUMENTS

| 8,054,840 B2 | 11/2011 | Booth et al. |
| 9,124,383 B1 | 9/2015 | Frankel et al. |
| 2008/0075071 A1 | 3/2008 | Beshai |
| 2009/0003356 A1 | 1/2009 | Vaswani et al. |
| 2011/0064086 A1 | 3/2011 | Xiong et al. |

(Continued)

OTHER PUBLICATIONS

Shuju Wu et al., "Active Delay and Loss Adaptation in Overly Multicast Tree", IEEE Communications Society, vol. 4,, Jun. 20, 2004, pp. 2014-2018.

(Continued)

*Primary Examiner* — Fahmida S Chowdhury
(74) *Attorney, Agent, or Firm* — Clements Bernard Walker; Lawrence A. Baratta, Jr.; Christopher L. Bernard

(57) ABSTRACT

Systems and methods for building routing tables for use in a data center network are provided. A switch is arranged in a network environment having a plurality of switches. The switch includes a plurality of inward-directed ports configured for direct connection with a plurality of servers and a plurality of outward-directed ports configured for direct connection with a subset of the plurality of switches. The switch also includes a processor configured to generate a Routing Table (RT) in an RT build process and to create a Forwarding Table (FT) for forwarding packets when the RT build process is complete. The outward-directed ports are configured to forward packets to one or more switches of the subset of switches according to the RT. The FT includes at least a Shortest Path (SP) route and one or more Off-Shortest Path (OSP) routes for forwarding the packets to the one or more switches.

15 Claims, 14 Drawing Sheets

(56) References Cited

U.S. PATENT DOCUMENTS

| | | | |
|---|---|---|---|
| 2011/0243136 | A1 | 10/2011 | Raman et al. |
| 2013/0108259 | A1 | 5/2013 | Srinivas et al. |
| 2013/0108263 | A1 | 5/2013 | Srinivas et al. |
| 2013/0108264 | A1 | 5/2013 | Deruijter et al. |
| 2013/0117449 | A1 | 5/2013 | Hares et al. |
| 2013/0287397 | A1 | 10/2013 | Frankel et al. |
| 2013/0322443 | A1 | 12/2013 | Dunbar et al. |
| 2014/0153924 | A1 | 6/2014 | Deruijter |
| 2014/0229944 | A1 | 8/2014 | Wang et al. |
| 2014/0270762 | A1 | 9/2014 | Li et al. |
| 2015/0076923 | A1 | 3/2015 | Frankel et al. |
| 2015/0350060 | A1* | 12/2015 | Patil ............... H04L 47/122 370/238 |
| 2017/0126481 | A1* | 5/2017 | Pignataro ............ H04L 45/22 |
| 2017/0187629 | A1 | 6/2017 | Shalev et al. |
| 2018/0123980 | A1* | 5/2018 | Frankel ............... H04Q 11/00 |
| 2019/0014034 | A1* | 1/2019 | Allan .................. H04L 45/24 |
| 2019/0068484 | A1* | 2/2019 | Oprea ................. H04L 45/40 |
| 2019/0158939 | A1 | 5/2019 | Frankel et al. |

OTHER PUBLICATIONS

Z. Ali et al., "Operations, Administration, and Maintenance (OAM) in Segment Routing Networks with IPv6 Data plane (SRv6)", Internet-Draft, Standards Track, Jul. 8, 2019, pp. 1-23.

Feb. 25, 2021, European Search Report for European Patent Application No. EP 20 20 2517.

Singla et al., "Jellyfish: Networking Data Centers Randomly," arXiv:1110.1687v3 [cs.NI] Apr. 20, 2012.

Jyothi et al., "Measuring and Understanding Throughput of Network Topologies," arXiv:1402.2531v3 [cs.NI] Feb. 9, 2015.

Farrington et al., Helios: A Hybrid Electrical/Optical Switch Architecture for Modular Data Centers, SIGCOMM'10, Aug. 30-Sep. 3, 2010, New Delhi, India. Copyright 2010 ACM 978-1-4503-0201-2/10/08.

Broadcom, HighDensity 25/100 Gigabit Ethernet StrataXGS® Tomahawk Ethernet Switch Series BCM56960 Series, accessed Oct. 21, 2015.

Koibuchi et al., "Layout-conscious Random Topologies for HPC Off-chip Interconnects," The 19th International Symposium on High-Performance Computer Architecture (HPCA), Feb. 2013.

Doyle, "Lessons from Altoona: What Facebook's newest data center can teach us," Network World (http://www.networkworld.com/) on Apr. 14, 2015.

Calient, "LightConnect™ Fabric Virtual Pod Data Centers," http://www.calient.net/solutions/lightconnectfabricvirtualpod-datacenters/, accessed Oct. 21, 2015.

* cited by examiner

| D | S=1 | | | S=2 | | | S=3 | | | S=4 | | | S=5 | | | S=6 | | | S=7 | | | S=8 | | |
|---|---|---|---|---|---|---|---|---|---|---|---|---|---|---|---|---|---|---|---|---|---|---|---|---|
| 1 | 0 | 0 | 0 | ∞ | 1 | ∞ | ∞ | ∞ | 1 | ∞ | 2 | 2 | 3 | 3 | 3 | ∞ | ∞ | 2 | ∞ | 2 | ∞ | 1 | ∞ | ∞ |
| 2 | ∞ | 1 | ∞ | 0 | 0 | 0 | 1 | ∞ | ∞ | ∞ | ∞ | 1 | 2 | ∞ | ∞ | ∞ | 3 | 3 | ∞ | 3 | 3 | 2 | ∞ | ∞ |
| 3 | ∞ | ∞ | 1 | 1 | ∞ | ∞ | 0 | 0 | 0 | ∞ | 1 | ∞ | 2 | ∞ | ∞ | ∞ | 3 | 3 | ∞ | 3 | 3 | 2 | ∞ | ∞ |
| 4 | ∞ | 2 | 2 | ∞ | ∞ | 1 | ∞ | 1 | ∞ | 0 | 0 | 0 | 1 | ∞ | ∞ | ∞ | 2 | ∞ | ∞ | ∞ | 2 | 3 | 3 | 3 |
| 5 | 3 | 3 | 3 | ∞ | ∞ | 2 | ∞ | 2 | ∞ | 1 | ∞ | ∞ | 0 | 0 | 0 | ∞ | 1 | ∞ | ∞ | ∞ | 1 | ∞ | 2 | 2 |
| 6 | 2 | ∞ | ∞ | ∞ | 3 | 3 | ∞ | 3 | 3 | 2 | ∞ | ∞ | ∞ | 1 | ∞ | 0 | 0 | 0 | 1 | ∞ | ∞ | ∞ | ∞ | 1 |
| 7 | 2 | ∞ | ∞ | ∞ | 3 | 3 | ∞ | 3 | 3 | 2 | ∞ | ∞ | ∞ | ∞ | 1 | 1 | ∞ | ∞ | 0 | 0 | 0 | ∞ | 1 | ∞ |
| 8 | 1 | ∞ | ∞ | ∞ | 2 | ∞ | ∞ | ∞ | 2 | 3 | 3 | 3 | ∞ | 2 | 2 | ∞ | ∞ | 1 | ∞ | 1 | ∞ | 0 | 0 | 0 |

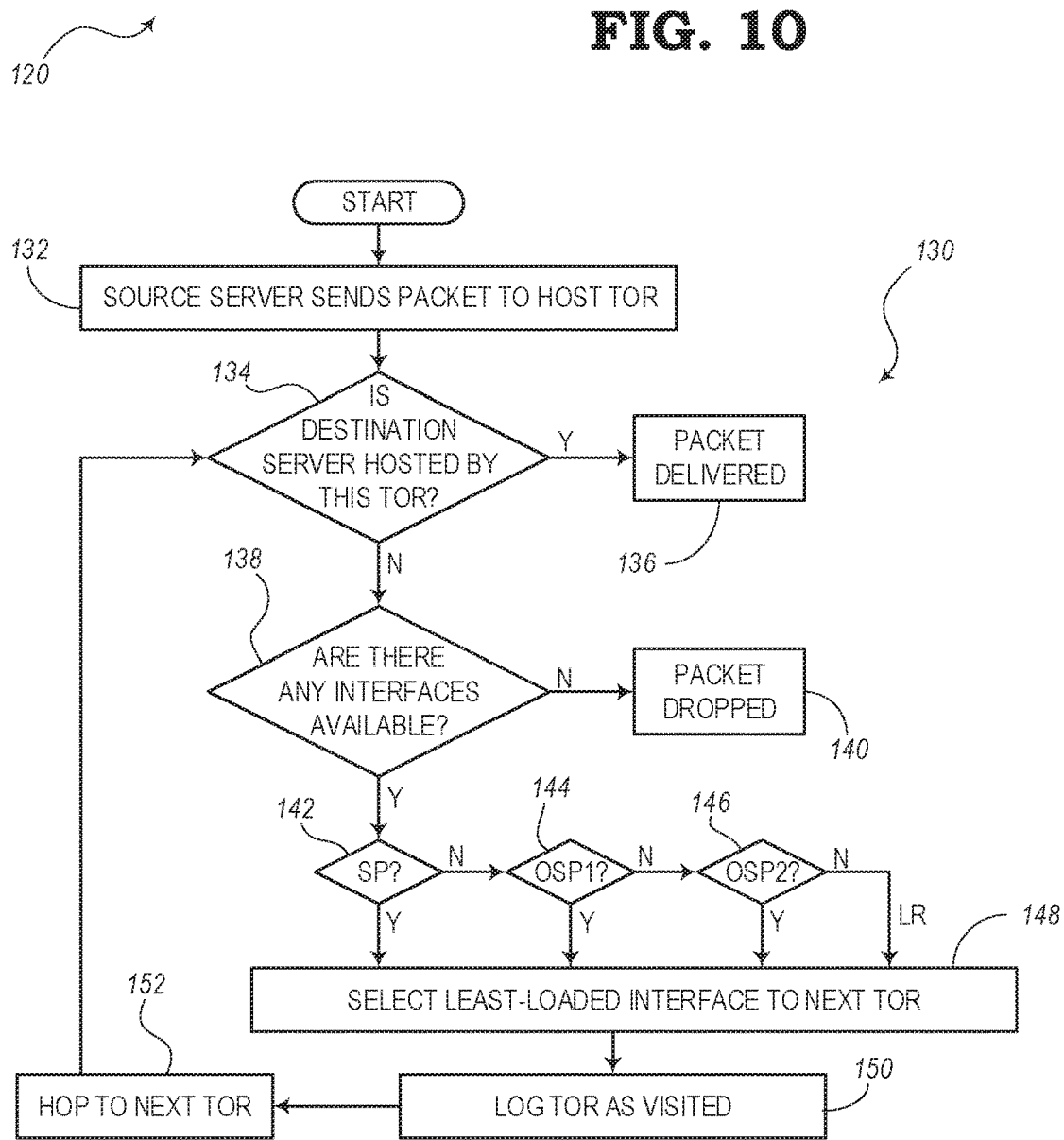

| D | S=1 | | | S=2 | | | S=3 | | | S=4 | | | S=5 | | | S=6 | | | S=7 | | | S=8 | | |
|---|---|---|---|---|---|---|---|---|---|---|---|---|---|---|---|---|---|---|---|---|---|---|---|---|
| 1 | 0 | 0 | 0 | 2 | 1 | 3 | 2 | 3 | 1 | 4 | 2 | 2 | 3 | 3 | 3 | 3 | 4 | 2 | 3 | 2 | 4 | 1 | 5 | 5 |
| 2 | 5 | 1 | 2 | 0 | 0 | 0 | 1 | 2 | 2 | 5 | 2 | 1 | 2 | 4 | 4 | 4 | 3 | 3 | 4 | 3 | 3 | 2 | 4 | 4 |
| 3 | 5 | 2 | 1 | 1 | 2 | 2 | 0 | 0 | 0 | 5 | 1 | 2 | 2 | 4 | 4 | 4 | 3 | 3 | 4 | 3 | 3 | 2 | 4 | 4 |
| 4 | 4 | 2 | 2 | 2 | 3 | 1 | 2 | 1 | 3 | 0 | 0 | 0 | 1 | 5 | 5 | 3 | 2 | 4 | 3 | 4 | 2 | 3 | 3 | 3 |
| 5 | 3 | 3 | 3 | 3 | 4 | 2 | 3 | 2 | 4 | 1 | 5 | 5 | 0 | 0 | 0 | 2 | 1 | 3 | 2 | 3 | 1 | 4 | 2 | 2 |
| 6 | 2 | 4 | 4 | 4 | 3 | 3 | 4 | 3 | 3 | 2 | 4 | 4 | 5 | 1 | 2 | 0 | 0 | 0 | 1 | 2 | 2 | 5 | 2 | 1 |
| 7 | 2 | 4 | 4 | 4 | 3 | 3 | 4 | 3 | 3 | 2 | 4 | 4 | 5 | 2 | 1 | 1 | 2 | 2 | 0 | 0 | 0 | 5 | 1 | 2 |
| 8 | 1 | 5 | 5 | 3 | 2 | 4 | 3 | 4 | 2 | 3 | 3 | 3 | 4 | 2 | 2 | 2 | 3 | 1 | 2 | 1 | 3 | 0 | 0 | 0 |

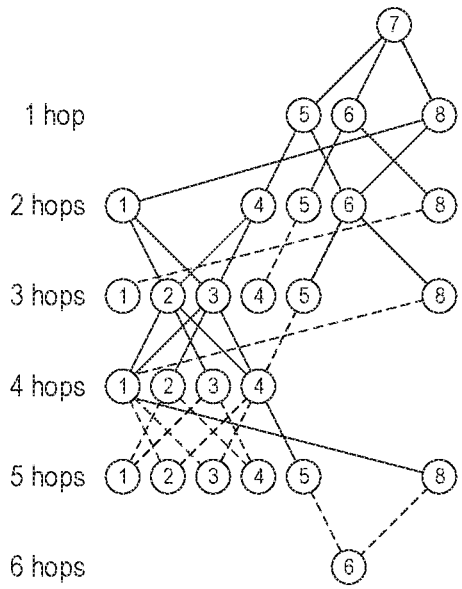
FIG. 18G
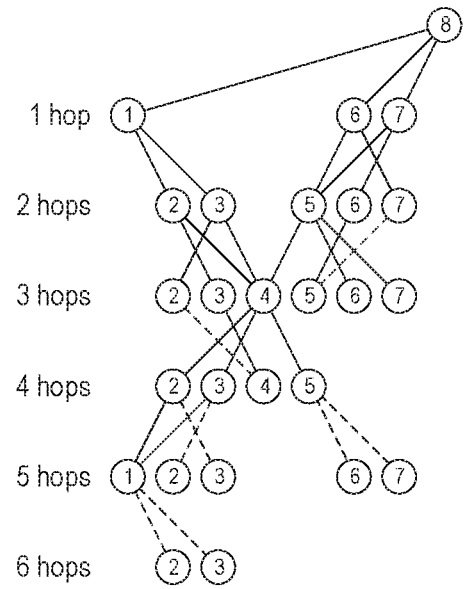
FIG. 18H
| D | S=1 | | | S=2 | | | S=3 | | | S=4 | | | S=5 | | | S=6 | | | S=7 | | | S=8 | | |
|---|---|---|---|---|---|---|---|---|---|---|---|---|---|---|---|---|---|---|---|---|---|---|---|---|
| 1 | 0 | 0 | 0 | 14 | 4 | 12 | 14 | 12 | 4 | 10 | 8 | 8 | 9 | 9 | 9 | 15 | 13 | 5 | 15 | 5 | 13 | 1 | 17 | 17 |
| 2 | 14 | 4 | 12 | 0 | 0 | 0 | 10 | 8 | 8 | 14 | 12 | 4 | 5 | 13 | 13 | 19 | 9 | 9 | 19 | 9 | 9 | 5 | 13 | 13 |
| 3 | 14 | 12 | 4 | 10 | 8 | 8 | 0 | 0 | 0 | 14 | 4 | 12 | 5 | 13 | 13 | 19 | 9 | 9 | 19 | 9 | 9 | 5 | 13 | 13 |
| 4 | 10 | 8 | 8 | 14 | 12 | 4 | 14 | 4 | 12 | 0 | 0 | 0 | 1 | 17 | 17 | 15 | 5 | 13 | 15 | 13 | 5 | 9 | 9 | 9 |
| 5 | 9 | 9 | 9 | 15 | 13 | 5 | 15 | 5 | 13 | 1 | 17 | 17 | 0 | 0 | 0 | 14 | 4 | 12 | 14 | 12 | 4 | 10 | 8 | 8 |
| 6 | 5 | 13 | 13 | 19 | 9 | 9 | 19 | 9 | 9 | 5 | 13 | 13 | 14 | 4 | 12 | 0 | 0 | 0 | 10 | 8 | 8 | 14 | 12 | 4 |
| 7 | 5 | 13 | 13 | 19 | 9 | 9 | 19 | 9 | 9 | 5 | 13 | 13 | 14 | 12 | 4 | 10 | 8 | 8 | 0 | 0 | 0 | 14 | 4 | 12 |
| 8 | 1 | 17 | 17 | 15 | 5 | 13 | 15 | 13 | 5 | 9 | 9 | 9 | 10 | 8 | 8 | 14 | 12 | 4 | 14 | 4 | 12 | 0 | 0 | 0 |
FIG. 19
210

US 11,121,984 B2

ROUTING TABLES FOR FORWARDING PACKETS BETWEEN SWITCHES IN A DATA CENTER NETWORK

TECHNICAL FIELD

The present disclosure generally relates to networking systems and methods. More particularly, the present disclosure relates to systems and methods for building routing tables and establishing packet forwarding protocols for use by switches interconnected in a loosely-structured data center network.

BACKGROUND

The portions of a telecommunications network that are typically incorporated within data centers, enterprise networks, Local Area Networks (LANs), High Performance Computing (HPC) environments, or other well-defined network environments are usually built with a highly-structured architecture. Some examples of highly-structured architectures that are frequently used within modern data center networks include FatTree, Clos, Dragonfly, Slim Fly, and B-Cube. These highly-structured network architectures are easy to visualize, can be built from smaller building blocks, provide high bisectional bandwidth, etc.

FIG. 1 is a diagram showing a data center 10 where switches 12 within the data center 10 are arranged in a conventional Clos network configuration. The data center 10 may include a plurality of racks 14, where each rack 14 may include a Top of Rack (TOR) switch 12L and a plurality of servers 16. Each switch 12L within the rack 14 may include a plurality of ports 18 for connection with the respective servers 16. In this arrangement, servers 16 within a single rack 14 may communicate with each other via the directly-connected switch 12L. For instance, communication from a first server 16 to a second server 16 within a rack 14 may include a first hop from the first server 16 to the switch 12L and a second hop from the switch 12L to the second server 16.

Hence, the Clos network in this data center 10 includes a first layer 20 (e.g., "leaf" layer) of switches (e.g., switches 12L) that are arranged within the racks 14. Furthermore, the Clos network includes a second layer 22 (e.g., "aggregation" layer) of additional switches 12A and a third layer 24 (e.g., "spine" layer) of additional switches 12S. The switches 12 in the leaf layer 20 are labeled "12L"; the switches 12 in the aggregation layer 22 are labeled "12A"; and the switches in the spine layer 24 are labeled "12S". The Clos arrangement includes a first set of links between the leaf switches 12L and the aggregation switches 12A and a second set of links between the aggregation switches 12A and the spine switches 12S. These links are not shown in FIG. 1, but instead are depicted in FIG. 2.

FIG. 2 shows a representation of the data center 10 having the conventional Clos network arrangement of switches 12. In the Clos arrangement, the first layer 20 of switches 12L includes ports designated for communication, by way of links or interfaces, with ports of multiple switches 12A in the second layer 22. Also, each of the switches 12A in the second layer 22 includes ports designated for communication, by way of links or interfaces, with ports of multiple switches 12S in the third layer 24. As opposed to the leaf switches 12L, which are connected to servers 16 (as shown in FIG. 1), the aggregation switches 12A in the second layer 22 and the spine switches 12S in the third layer 24 are not directly connected to any servers. Instead, the switches 12A, 12S are utilized merely as intermediate switches for creating paths between any two servers 16 in any of the racks 14 for communication therebetween.

With this configuration, any server 16 in any rack 14 may be able to communicate with any other server 16 in any rack 14 within the data center 10. In some cases, inter-rack communication may include only a single switch 12A in the second layer 22 if that switch 12A is connected directly to each of the two racks 14 of interest. For instance, if first and second racks 14 are each connected to a first switch 12A in the second layer 22, communication from any server in the first rack 14 can communicate with any server in second rack 14 via the corresponding switch 12L of the first rack 14, via the first switch 12A of the aggregation layer 22, and via the switch 12L of the second rack 14. However, if an aggregation switch 12A is not connected directly to the corresponding switches 12L, then two hops may need to be added to the route using a connecting spine switch 12S in the third layer 24. Therefore, the number of hops from one TOR switch 12L to another is at most four in the three-layer network of this highly-structured data center 10. With this configuration, traffic can be easily routed with Equal-Cost Multi-Path (ECMP) routing and is resilient to failure. If necessary, this network can be scaled further at the cost of additional layers.

At the same time, highly-structured networks suffer from some well-known problems. First, there is increased latency due to many hops, especially as the number of layers grows with highly-structured network architectures. High network loads can produce filled switch buffers, thereby increasing latency. Second, highly-structured network architectures are deployed in discrete implementation sizes, and higher layer ports may go unused in an underfilled network.

The Clos network arrangement of the conventional data center 10 shows the three-layer leaf-spine folded-Clos network with the various switches 12 interconnecting the multiple servers 16. Again, the first layer of switches 12L (i.e., leaf layer switches) are connected to the second layer of switches 12A (i.e., aggregation layer switches), which in turn are connected to the third layer of switches 12S (i.e., spine layer switches). As an example, with the three-layer (L=3) Clos network arrangement using switches having a port count of "k," the relationships between port count (k) and the number of switches and servers that may exist is as follows:

$k=24 \rightarrow$ switches=720, servers=3456;

$k=32 \rightarrow$ switches=1280, servers=8192;

$k=64 \rightarrow$ switches=5120, servers=65536.

For Clos computations (k-port switches, L switching layers), the number of layers (L) that is required is defined as follows:

$$L = \log(N_{serv}/2)/\log(k/2) \sim \log(N_{serv})/\log(k).$$

The number of servers ($N_{serv}$) that can be accommodated is defined as:

$$N_{serv} = k*(k/2)*(k/2) = 2*(k/2)^L.$$

Also, the total switch count ($N_{switch}$) that is required is defined as:

$$N_{switch} = (2L-1)*(k/2)^{(L-1)}.$$

A third well-known problem of highly-structured networks is that their architectures have difficulty in horizontal scaling by requiring multiple layers. Horizontal scaling is explained as follows. In general, hardware devices, such as Application Specific Integrated Circuits (ASICs), are port limited by available pins. This means bandwidth can increase, but usually, most increases are achieved by increasing port speeds, such as increasing from 25G to 56G. That is, port counts are difficult to increase. However, port counts determine horizontal fan-out capability such as in the Clos network arrangement. Therefore, network horizontal scale growth will eventually face problems in terms of network layer increases. Each layer requires interconnect, which requires high power backplanes and/or expensive optics.

Fourth, highly-structured network architectures are susceptible to cluster-packing problems which confine jobs within clusters to reduce latency and improve efficiency. However, the resources (e.g., processor (CPU), storage, etc.) in the cluster can often be under-utilized as they must then be sized to anticipate large loads.

In contrast to highly-structured network architectures, a purely "random" interconnect approach, while overcoming some of the aforementioned disadvantages, has issues in construction, maintenance, and management. First, a single randomizer device (for an entire network) is difficult to construct, manage, and repair. Second, there are requirements to preserve randomized interconnection, but also allow spatial separation for data center reliability. Third, fiber cabling is unmanageable. Fourth, random networks are difficult to visualize and administer.

Additionally, the Clos network arrangement of data center 10 offers multiple paths between any source and destination pair and these paths inherently have equal costs. Consequently, they can be exploited by existing routing techniques, either distributed or centralized, as Equal-Cost Multi-Path (ECMP). A more hardware-efficient pseudo-random network interconnect model, which may not have the intrinsic diverse and ECMP property of the Clos network arrangement 10, may be considered. This model might not be efficiently routed by known ECMP techniques. Experimental pseudo-random interconnect fabrics have been described in the literature, but these fabrics use conventional routing mechanisms, and so have had destination-dependent multipath breadth.

Routing tables are a product of a routing protocol which assesses the paths for efficient delivery of packets or flows between any pair of source and destination nodes. The routing protocol constructs and maintains (e.g., optimizes) routing tables based on these efficient-path assessments. Quantitative metrics of this assessment, in a simplest case, may be just "hop count to destination" when forwarding through this specific interface. Other composite and more complex metrics might incorporate link bandwidth, delay, cost, reliability, and load with the risk of potential instability due to the dynamic nature.

There are two main classes of routing protocols, which differ in the way that routing tables are built. The first class of routing protocols includes "source-oriented Link-State (LS)" protocols and the second includes "destination-oriented Distance-Vector (DV)" protocols.

Regarding source-oriented Link-State (LS) protocols, "source-oriented" routing protocols imply that all the information about a network topology required to route a packet across the network is generated and provided by the source node. The basic idea behind the "LS" protocols is that every node knows how to reach its directly connected neighbors, and if the totality of this knowledge is disseminated to every node, then every node will have sufficient knowledge of the network to build a complete map.

Link State (LS) routing protocols rely on two mechanisms: 1) reliable dissemination of information about the state of the links, and 2) the calculation of routes from the sum of all the accumulated knowledge about the state of the links. Every node reliably broadcasts the state of its local links to all network nodes. Based on this state, the required routing tables are locally created at every node. Subsequent forwarding tables containing all the information necessary to route a packet from each source node to any destination node are stored at this source node. Packets can be sent to the destination with the documented travel route embedded in them, either explicitly as in Source Routing or implicitly by assuming that every node has the same network view as in Border Gateway Protocol (BGP). Open Shortest Path First (OSPF) is an example of an LS protocol. LS routing, however, suffers from at least three known problems: (1) high storage overhead, (2) high path computation overhead, and (3) high link state update overhead.

Regarding destination-oriented Distance-Vector (DV) protocols, "destination-oriented" routing protocols make routing decisions on a hop-by-hop basis, using information locally held at each node to determine where the next hop has to be taken by each incoming packet. The assumption for "DV" routing is that each node knows the metric of the links to its directly connected neighbors. In a process of building routing tables, every node sends to its neighbors a one-dimensional array (i.e., vector) containing known metrics (i.e., distance) to all the other nodes in the network. As the network is being initialized, all DVs to be sent are initiated at infinities and seeded with known metrics to the nearest adjacent neighboring nodes.

The routing tables are built by a simple rule, where every node compares the current metric to the destination in the locally stored DV with the metric received from its neighbor plus the metric to get to the neighbor and retains the smallest of the two. That is, the metric to each destination is updated in a monotonically decreasing manner. The node then re-sends the DVs to its neighbors only if the new metric decreased. Finally, when metrics stop decreasing, the nodes naturally stop re-sending their DVs and the process of building the RTs is completed. This approach is called the Bellman-Ford algorithm, and it converges in number of exchanges of DVs between the neighbors of the order of network diameter. Routing Information Protocol (RIP) is a canonical example of a destination-oriented routing protocol built on the above-described DV algorithm.

Problems with the Distance-Vector (DV) protocol arise during updates, especially the ones triggered by the changes of the state of the link (e.g., link failure or recovery). In this case, DV exchange is started by the node which first detected the change of the state of the link and continues until completion. Depending on the timing of the events, the infamous "counting to infinity" situation can occur, causing the DV exchanges to get caught in a loop. Countermeasures (e.g., split horizon, split horizon with poison reverse, etc.) are efficient only when the routing loops involve two nodes. To avoid larger routing loops, more drastic measures may be called for, which may involve delays and, hence, impede the convergence of the protocol.

A destination-oriented routing protocol (e.g., Enhanced Interior Gateway Routing Protocol (EIGRP)) determines the best next hop "successor" nodes for Shortest Path Routing (SPR) using loop-avoiding Distributed Updating Algorithm (DUA) to gather topology information. On top of that DUA also attempts to find one or more "feasible successors" for Off-Shortest Path Routing (OSPR). This process provides both equal-cost, multi-path forwarding (if more than one "successor" is found) as well as multi-cost, multi-path forwarding (if additional "feasible successors" are found).

There are just a few of these OSPR alternatives (in addition to SPR) because of the strict requirement for the "feasible successors" to be topologically loop-free. This leaves the majority of interfaces unavailable for alternative forwarding in case all links leading to both "successors" and "feasible successors," if any, are overloaded. As a result, packets will be dropped at an elevated rate as traffic load increases.

Therefore, there is a need in the field of data center networks to provide simpler, more reliable, and more efficient routing tables and forwarding algorithms that can be used for routing data packets within a data center.

SUMMARY

The present disclosure describes systems and methods for building an efficient routing table for use in a data center environment or other type of network environment. The routing tables can be used for forwarding packets through the data center while avoiding loops and enable propagation along shortest paths and various off-shortest paths, as necessary. In one embodiment, a switch is arranged in a network environment having a plurality of switches. The switch may include a plurality of inward-directed ports configured for direct connection with a plurality of servers and a plurality of outward-directed ports configured for direct connection with a subset of the plurality of switches arranged. The switch may also include a processor configured to generate a Routing Table (RT) in an RT build process and to create a Forwarding Table (FT) for forwarding packets when the RT build process is complete. The outward-directed ports are configured to forward packets to one or more switches of the subset of switches according to the FT. Also, the FT includes at least a Shortest Path (SP) route and one or more Off-Shortest Path (OSP) routes for forwarding the packets to the one or more switches.

According to another embodiment, a computing system may comprise a processing device and a memory device configured to store a routing table building module. The routing table building module includes instructions configured to enable the processing device to forward packets within a network environment having a flat network architecture. The flat network architecture includes an arrangement for interconnecting a plurality of switches in a single leaf layer. Each of the plurality of switches includes a plurality of inward-directed ports configured for direct connection with a plurality of servers and a plurality of outward-directed ports configured for direct connection with a subset of the plurality of switches arranged in the flat network architecture. The routing table building module is configured to enable the processing device to build a Routing Table (RT) to be made available to the plurality of switches. The RT defines how each switch forwards packets via the respective outward-directed ports and includes at least a Shortest Path (SP) route and one or more Off-Shortest Path (OSP) routes for forwarding the packets.

According to yet another embodiment, a non-transitory computer-readable medium is configured to store software having instructions. When executed, the instructions cause one or more processing devices to build a Routing Table (RT) having at least a Shortest Path (SP) route and one or more Off-Shortest Path (OSP) routes. The instructions further cause the one or more processing devices to make the RT available to a plurality of switches within a data center, where the switches are arranged in a flat network architecture having a structured, pseudo-random layer and having no aggregation layer switches or spine layer switches. The one or more processing devices also instruct each switch to forward packets to destination switches according to the RT.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 10 is an updated routing table incorporating shortest paths and off-shortest paths, according to various embodiments;

FIG. 11 is a flow diagram illustrating a method for executing a packet forwarding algorithm, according to various embodiments;

FIGS. 18A-18H are diagrams illustrating updated hop configurations for various nodes of the STRAT network architecture of FIG. 17, according to various embodiments; and FIG. 19 is an updated routing table incorporating loopless propagation along with the composite metric, according to various embodiments.

DETAILED DESCRIPTION

Figure 1:
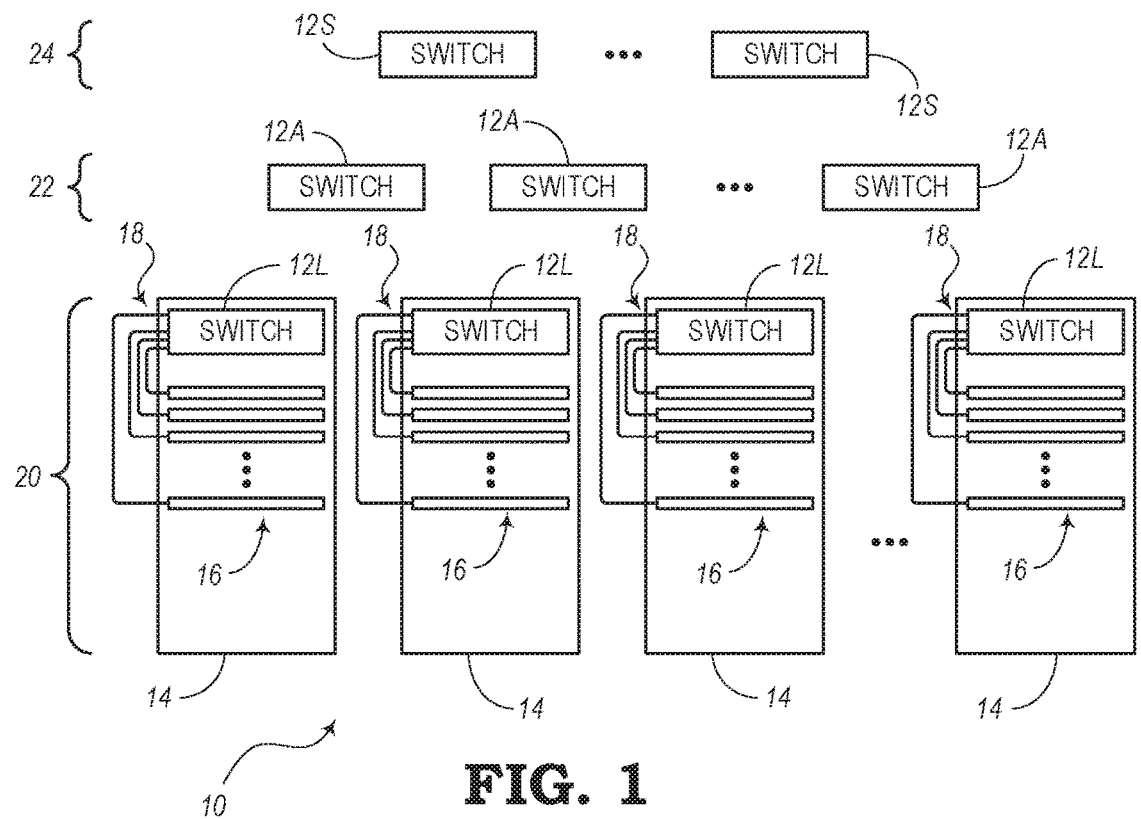
FIG. 1 is a diagram showing a data center arranged in a conventional Clos network configuration.

The present disclosure relates to systems, methods, and protocols for building routing tables for use in a data center of a telecommunications network. As is known, data centers are currently experiencing rapid growth. In contrast to a highly-structured network where intermediate switches are added in at least one additional layer, the systems of the present disclosure use a single, flat layer of switches, such as the Top of Rack (TOR) switches which already exist within a rack of a data center architecture. Thus, instead of adding extra switches to construct the conventional highly-structured network, the switches (e.g., TOR switches) of the data center may be interconnected with each other in a pseudo-random manner or interconnected in a structured or patterned manner.

For example, a network environment (e.g., data center, LAN, enterprise, etc.) may include multiple racks, where the racks include switches (e.g., TOR switches) each having direct interconnections with other TOR switches of other racks. Instead of forwarding packets through intermediate aggregation and spine layers, the network architecture of the present disclosure allows for the forwarding of packets from a source switch to a destination switch in a single hop or via intermediate TOR switches over multiple hops as needed. In this respect, the switches may include three or more ports dedicated to these interconnections with other TOR switches. The remaining ports may be used for connection with the plurality of servers on the respective rack.

Therefore, with this "structured" and "rearranged" (STRAT) configuration described herein, the switches in each rack are able to more efficiently connect a corresponding server within that rack to another server of another rack via the corresponding switch of the other rack. By eliminating the intermediate layers of extra switches (i.e., switches 12A and 12S in layers 22, 24 shown in FIGS. 1 and 2), communication from one server to another can be achieved in a manner that may require fewer hops.

The present disclosure therefore provides a more efficient protocol for building and using routing tables within a data center or other network environment where the switch connections are arranged in a more loosely-structured configuration. Although there are needs for creating better "boxes" and better "software applications," improvements in data center network configurations are contemplated herein. The present disclosure describes various solutions for improving the architecture of these data centers by moving away from the highly-structured paradigm and creating a loosely-structured configuration, also referred to herein as the STRAT configuration. In the context of this loosely-structured network configuration, routing tables can be created, as described in the present disclosure, for forwarding packets among the flat layer of TOR switches.

The implementations described in the present disclosure include a network architecture that is different from the current industry approach, which typically includes a multi-tier Clos arrangement. For example, instead of using multiple layers as is done with Clos networks, the network configurations described in the present disclosure do not use additional layer, but instead utilize only the Top of Rack (TOR) switches within the respective racks for enabling communication between servers in the data center. Unlike the Clos arrangement, the present embodiments include no switches which serve a purely network interconnect function. That is, there are no "aggregation" or "spine" layers.

As introduced above, the conventional Clos arrangement (or other similar fabric highly-structured arrangement) utilizes a massive any-to-any switching structure in a data center. With Clos, a multi-layer switch hierarchy (i.e., with at least a leaf layer (e.g., TOR layer) 20, one or more aggregation layers 22, and a spine layer 24) is arranged to offer a number of possible paths between any two endpoints, typically providing one distinct path passing through each spine switch 12S.

Because these structures are highly regular, all the available paths between any two end points have the same number of hops, which results in a consistent path cost. Consequently, well-known routing techniques with this architecture can apply shortest path first and ECMP algorithms to spread load across all available paths, without danger of loop formation under stable network conditions. This spreading is essential in these fabric designs to mitigate against asymmetric traffic loads and the consequent traffic "hot-spots" which would be caused if traffic was constrained to a single path.

Although very widely deployed, Clos is not the only switching structure for these applications. The present disclosure describes a "flat" switch architecture, where all switches are leaves (e.g., switches 12L). Also, the arrangements described herein have a pseudo-random interconnect between leaf switches to provide the required any-to-any connectivity. Intermediate leaf switches can be used for forwarding packets to a destination over multiple hops. Compared to the Clos arrangement, the flat arrangement described in the present disclosure typically requires about ⅔ of the number of ports on each switch that would be dedicated to leaf-to-leaf interconnection. Thus, the rest of the ports can be used for connection to hosts (e.g., servers). The ratio between ports for leaf-to-leaf interconnection and ports for host connection can be used as a trade-off of network throughput performance versus cost and power.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive concepts, upon which the present disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

STRAT Network Architecture

Figure 3:
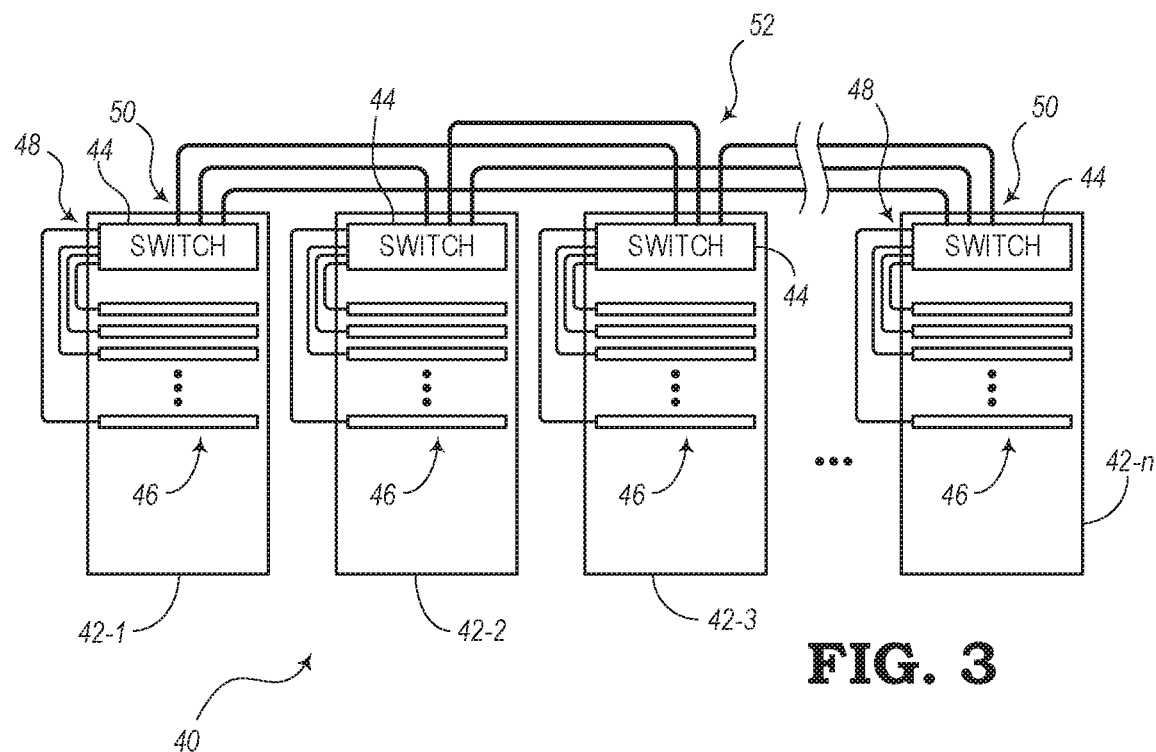
FIG. 3 is a schematic diagram illustrating a data center arranged in a structured, rearranged (STRAT) configuration, according to various embodiments of the present disclosure.

FIG. 3 is a schematic diagram illustrating an embodiment of a network environment 40 (e.g., data center, high-performance computing application, enterprise, LAN, etc.) arranged in a structured, rearranged (STRAT) network architecture. The STRAT configuration is a flat (i.e., single layer) arrangement of interconnecting switches in the network environment 40. The network environment 40 in this example includes a number of racks 42-1, 42-2, 42-3, . . . , 42-n. Each rack 42 includes a switch 44, such as a TOR switch. Each switch 44 includes a number of ports 48 (e.g., inward directed ports) dedicated for connection with a plurality of servers 46 (e.g., blade servers) within the respective rack 42. Each switch 44 also includes a number of ports 50 (e.g., outward directed ports) for direct connection with at least two other switches 44 within other racks 42. The direct interconnection of switches 44 may be made through electrical and/or optical transmission links 52 or interfaces. As described in more detail below, each switch 44 may include two or more links 52 for connection with any two or more of the other switches 44 in the network environment 40. According to the example shown in FIG. 3, each switch 44 includes three outward-directed ports 50, whereby three links 52 provide connection with three different switches 44. Also, as described below, the links 52 may include interconnections that form a loosely-structure or pseudo-random arrangement (e.g., STRAT arrangement).

As described herein, the structured, rearranged network architecture has advantages over the highly-structured network architectures (e.g., Fat Tree, Clos, Dragonfly, Slim Fly, B-Cube, etc.) in higher throughput, lower latency, flexibility for traffic patterns, expansion and extendability, support for new technology, and overall link count. In addition to the advantages over highly-structured network architectures, the STRAT network architecture described herein also overcomes the aforementioned limitations of purely random networks. The STRAT network architecture configures more network-facing ports 50 (e.g., outward directed ports facing other TOR switches) as opposed to server-facing ports 48. This contrasts with the highly-structured network architectures which dedicates more ports as server-facing.

Further, the present disclosure relates to an efficient routing protocol for loosely structured or unstructured networks such as the structured, rearranged (STRAT) network architecture. The routing protocol provides safe (i.e., loop-free) off-shortest paths using a computationally-efficient technique which is deployable at scale, and which is especially suited to a fabric employing a loosely structured or unstructured interconnect topology. Advantageously, the routing protocol, described in more detail below, provides the ability to efficiently and rapidly adapt to network congestion and connectivity failures using only local metrics, without requiring congestion notification algorithms.

Figure 4:
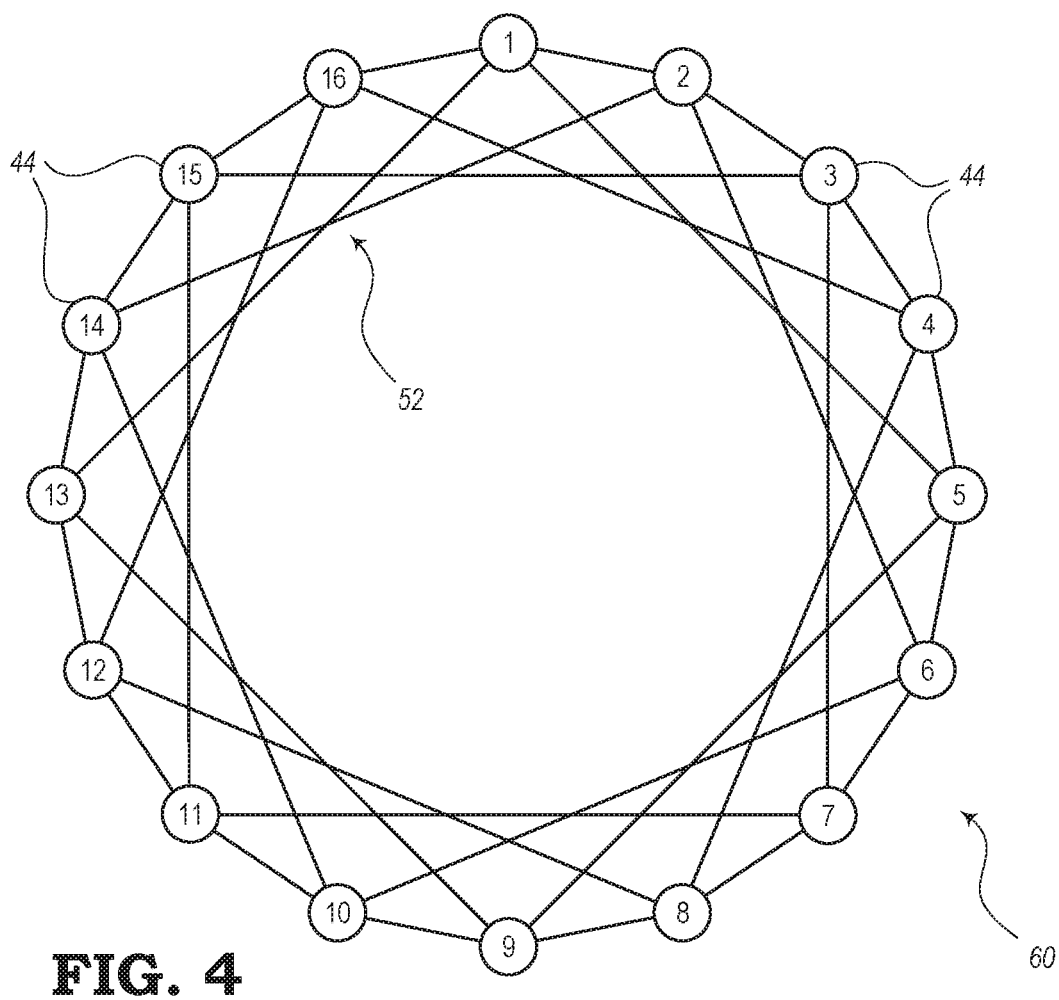
FIG. 4 is a schematic diagram illustrating switches arranged in the STRAT network architecture within the data center of FIG. 3, according to various embodiments of the present disclosure.

FIG. 4 is a diagram illustrating the switches 44 shown in FIG. 3, wherein the number of TOR switches 44 and corresponding racks 42 is sixteen (i.e., n=16). The switches 44 are labelled from 1 to 16 in FIG. 4 and are arranged in a STRAT network architecture 60 within the network environment 40 or data center. Although the switches 44 are shown in FIG. 4 as being arranged in a circle, it should be noted that this arrangement is only for illustrative purposes and does not necessarily reflect the actual location of the switches 44 with respect to each other within the network environment 40. Also, in this example, the STRAT network architecture 60 includes the links 52 interconnecting the switches 44, whereby each switch 44 includes four interconnections via four different links 52 to four different switches 44. In the configuration shown in FIG. 4, each switch 44 includes four ports 50 where four corresponding links 52 are used for connection with four other switches 44.

Figure 2:
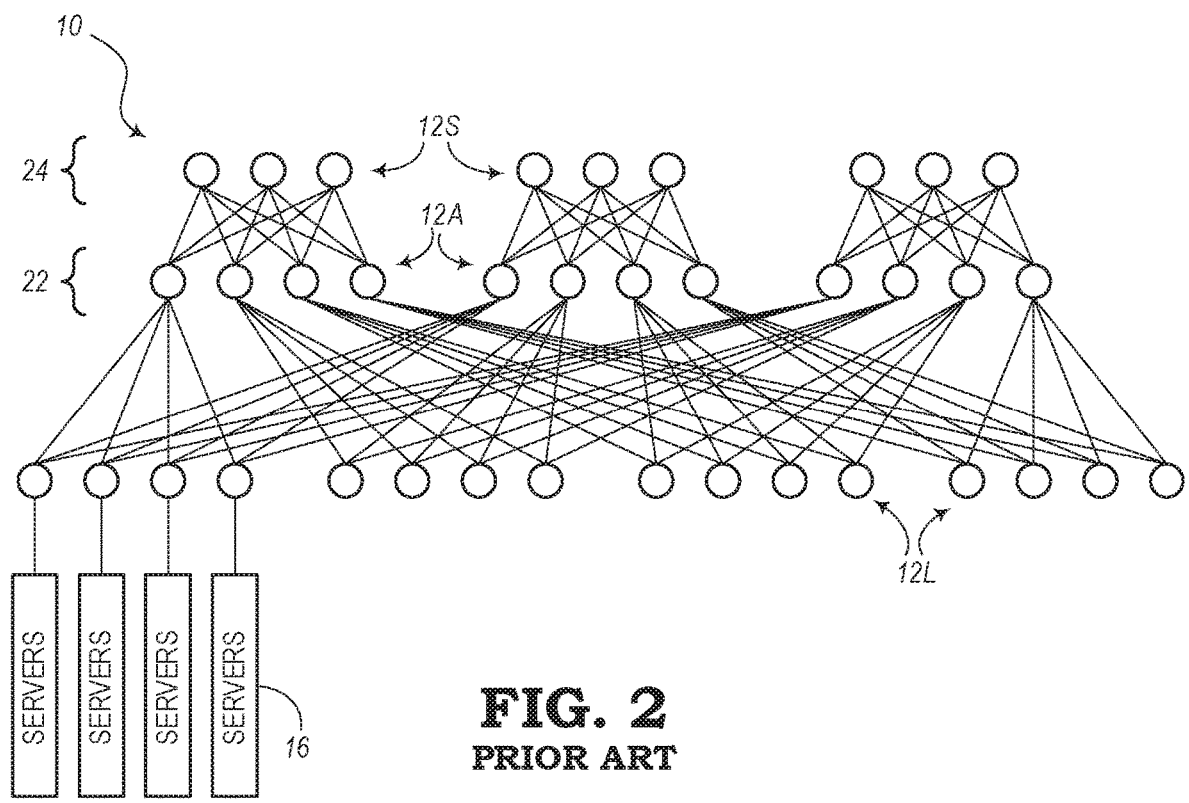
FIG. 2 is a diagram showing the conventional Clos network arrangement of the data center of FIG. 1.

For illustrative purposes, the STRAT network architecture 60 of FIG. 4 does not show the servers 46, but those of ordinary skill in the art will understand that each of the switches 44 can include local connections or links (e.g., via ports 48) with one or more servers 46 as shown in FIG. 3. Again, the switches 44 may all be TOR switches since there are no switches which serve a purely network interconnect function. That is, there is no aggregation layer (e.g., no second layer 22 as shown in FIG. 1), spine layer (e.g., no third layer 24 as shown in FIG. 1), or any other additional layers in the STRAT network architecture 60.

Each switch 44 has a number of ports 50 which face towards other switches 44 in the network. The interconnections (i.e., links 52) between switches 44 in FIG. 4 are established in a uniform, repeating manner. However, in other embodiments, the links 52 may include a pseudo-random, non-repeating pattern. Each switch 44 is connected to another switch 44 by not more than a single port via not more than a single link 52. Again, each switch 44 may have additional ports 48 for connections with the corresponding servers 46 within a rack 42, but these connections are not shown in FIG. 4 for simplicity.

A data center (e.g., network environment 40 of FIG. 3) may have hundreds or even thousands of switches 44. It may not be intuitively obvious, but the STRAT network architecture 60 may be much more efficient in operating with less hardware and may provide higher throughput and achieve lower latency than highly-structured network architectures, such as Clos, Dragonfly, B-cube, etc. For instance, these attributes are described in Sangeetha Abdu Jyothi et al., "Measuring and Understanding Throughput of Network Topologies," Feb. 11, 2014, and available at arxiv.org/abs/1402.2531v3; Ankit Singla et al., "Jellyfish: Networking Data Centers Randomly," Oct. 8, 2011, and available at arxiv.org/abs/1110.1687; and Henry Casanova et al., "Layout-conscious Random Topologies for HPC Off-chip Interconnects," 2013 IEEE 19th International Symposium on High Performance Computer Architecture (HPCA2013), whereby the contents of each of the foregoing are incorporated by reference herein.

In a data center with hundreds or thousands of switches 44, for example, if each of the switches 44 has 16 network-facing ports, then each switch 44 can reach 16 neighboring switches in one hop, a maximum of 240 switches in two hops, a maximum of 3600 switches in three hops, a maximum of 54,000 switches in four hops, etc. In contrast, the Clos network 10 topology requires at least two hops for two layers, four hops for three layers, six hops for four layers, etc.

In the example of FIG. 4 with 16 switches 44 and a configurable expectation to reach any other switch with a maximum of two hops, the STRAT network architecture 60 would require about 5 ports per switch 44. According to another example with 4096 switches and a maximum of four hops, the STRAT network architecture would require about 16 ports per switch.

Some of the advantages of single-layer, structured, rearranged (STRAT) architectures are enumerated as follows. The STRAT network architecture can use commercial, off-the-shelf components, such as switch ASICs, pluggable optical modules, etc. No custom electronic hardware developments are needed. The STRAT network architecture is a completely de-layered, flat network. The STRAT network architecture has higher throughput and much fewer hops (five or lower) with high diverse path count (simulation details are presented herein), relative to the structured network architectures. Also, the STRAT network architecture can achieve fewer optical links and switches, i.e., reduced hardware at fixed throughput (simulation details are presented herein), relative to the highly-structured network architectures.

The STRAT network architecture exhibits, in deployment and rollout, a smooth, continuous trade-off between hardware cost and throughput (e.g., no large discrete increments in hardware or cost). The STRAT network architecture is easily scalable, i.e., new server and switch insertion is simple, even with different port counts and technologies. Also, the STRAT network architecture requires payment and deployment of only the servers being used (e.g., no under-utilized aggregation or spine switches). The ports of the STRAT network architecture can be aggregated into a few large bundles, improving optical transceiver cost and front-panel density (e.g., typically 16 distinct port bundles are sufficient). In contrast, Clos scalability requires very large port fan-out to realize large network East-West (horizontal) scalability. The STRAT network architecture substantially increases resilience to failure through richer interconnects and through workload spread across the full data center, relative to the structured network architectures. Finally, the STRAT network architecture is a fully packetized approach.

This pseudo-random interconnect model offers rich connectivity between any two leaf switches, but not all possible paths are of equal lengths. As a result, conventional ECMP techniques will not expose sufficient paths for optimal load-spreading under all circumstances. Further, routes cannot be "deduced" from switch addresses, as they can be in a structured configuration. Consequently, for this fabric architecture, a routing technique with the following attributes is highly desirable:
  offers "Off-Shortest path" (OSP) routes in addition to Shortest Path (SP) routes,
  guarantees all paths to be loop-free,
  exhibits computational simplicity,
  exhibits rapid forwarding table updates at both initial configuration as well as network updates, failure, and restoration,
  is able to rapidly and efficiently route packets around local link congestion,
  is able to rapidly reroute around network failures,
  maintains low latency, and
  alleviates Incast problems for packets that converge onto a single destination link or port.

The present disclosure describes intra-domain autonomous system (AS) destination-oriented routing algorithm developed for switch-centric bidirectional networks. Routing algorithms build Routing Tables (RTs) by defining the port from which a packet is to be forwarded on its way to its final destination. The port and forwarding definitions are stored in the Forwarding Tables (FTs) at every switch. The present disclosure describes details of how these tables are constructed, maintained, and utilized.

Programmable switch ASICs may be utilized to open a possibility of implementing efficient forwarding protocols that do not follow existing standards. As such, custom RTs can be developed for efficiently routing packets throughout a data center or other closed ecosystem. The implementations described herein can operate well in a very large-scale network having a limited diameter and geographic extent. Therefore, the RTs are particularly appropriate for Inside Data Center networks.

Constructing Routing Tables

Figure 5:
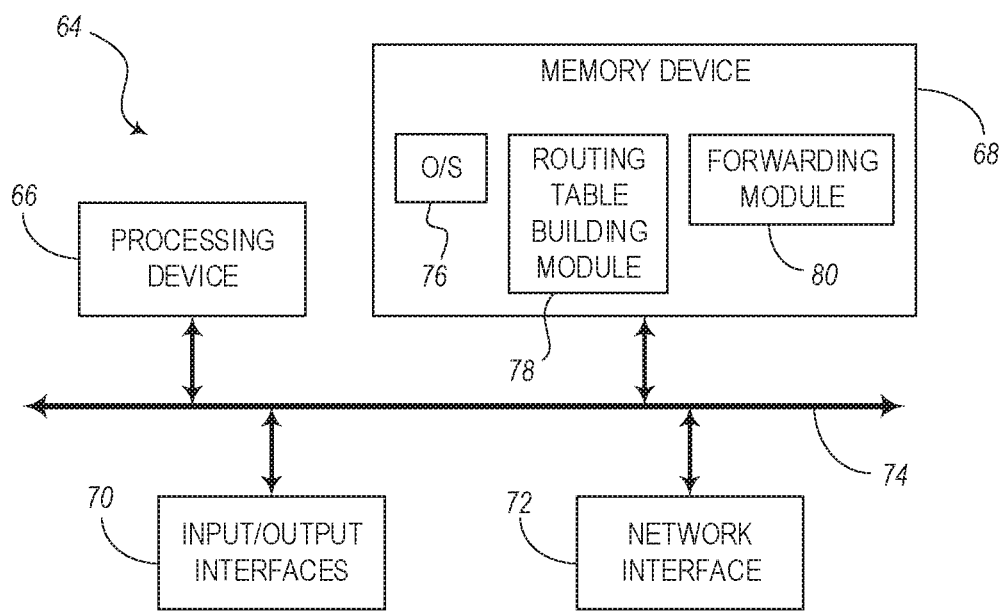
FIG. 5 is a block diagram illustrating a computing system for executing the method of building a routing table and applying forwarding algorithms in a STRAT network, according to various embodiments.

FIG. 5 is a block diagram illustrating an embodiment of a computing system 64 for executing procedures for building a routing table for use in a STRAT network architecture of a data center. The computing system 64 may be incorporated in any network element (e.g., switch 44, server 46, etc.) in the data center or within an external device in communication with the network elements of the data center. As shown in FIG. 5, the computing system 64 may include a processing device 66, a memory device 68, input/output (I/O) interfaces 70, and a network interface 72, each interconnected via a local interface 74 or bus.

Various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

Further, those skilled in the pertinent art will appreciate that the various illustrative logical blocks, modules, circuits, algorithms, and steps described in connection with the embodiments disclosed herein may be implemented as electronic hardware, computer software, firmware, or any suitable combinations thereof. To clearly illustrate this interchangeability of hardware and software, various illustrative components, blocks, modules, circuits, algorithms, and steps have been described in the present disclosure in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the illustrated embodiment of FIG. 5, the computing system 64 may be a digital computer that, in terms of hardware architecture, generally includes the processing device 66, the memory device 68, the I/O interfaces 70, and the network interface 72. The memory device 68 may include a data store, database, or the like. It should be appreciated by those of ordinary skill in the art that FIG. 5 depicts the computing system 64 in a simplified manner, where practical embodiments may include additional components and suitably configured processing logic to support known or conventional operating features that are not described in detail herein. The local interface 74 may be, for example, but not limited to, one or more buses or other wired or wireless connections. The local interface 74 may have additional elements, which are omitted for simplicity, such as controllers, buffers, caches, drivers, repeaters, receivers, among other elements, to enable communications. Further, the local interface 74 may include address, control, and/or data connections to enable appropriate communications among the components 66, 68, 70, 72.

The processing device 66 is a hardware device adapted for at least executing software instructions. The processing device 66 may be any custom made or commercially available processor, a central processing unit (CPU), an auxiliary processor among several processors associated with the computing system 64, a semiconductor-based microprocessor (in the form of a microchip or chip set), or generally any device for executing software instructions. When the computing system 64 is in operation, the processing device 66 may be configured to execute software stored within the memory device 68, to communicate data to and from the memory device 68, and to generally control operations of the computing system 64 pursuant to the software instructions.

It will be appreciated that some embodiments of the processing device 66 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 66 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry or logic" that is "configured to or adapted to" perform a set of operations, steps, methods, processes, algorithms, functions, techniques, etc., on digital and/or analog signals as described herein for the various embodiments.

The I/O interfaces 70 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 70 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 72 may be used to enable the computing system 64 to communicate over a network or a portion of a network, such as a telecommunications network in which the network environment 40 operates, the Internet, a wide area network (WAN), a local area network (LAN), and the like. The network interface 72 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 72 may include address, control, and/or data connections to enable appropriate communications on the network.

The memory device 68 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 68 may incorporate electronic, magnetic, optical, and/or other types of storage media. The memory device 68 may have a distributed architecture, where various components are situated remotely from one another, but can be accessed by the processing device 66. The software in memory device 68 may include one or more software programs, each of which may include an ordered listing of executable instructions for implementing logical functions. The software in the memory device 68 may also include a suitable operating system (O/S) 76 and one or more computer programs, such as a routing table building module 78 and a forwarding module 80. The O/S 76 essentially controls the execution of other computer programs, and provides scheduling, input-output control, file and data management, memory management, and communication control and related services. The computer programs may be configured to implement the various processes, algorithms, methods, techniques, etc. described herein.

The memory device 68 may include a data store used to store data. In one example, the data store may be located internal to the computing system 64 and may include, for example, an internal hard drive connected to the local interface 74 in the computing system 64. Additionally, in another embodiment, the data store may be located external to the computing system 64 and may include, for example, an external hard drive connected to the I/O interfaces 70 (e.g., SCSI or USB connection). In a further embodiment, the data store may be connected to the computing system 64 through a network and may include, for example, a network attached file server.

Moreover, some embodiments may include a non-transitory computer-readable storage medium having computer readable code stored in the memory device 68 for programming the computing system 64 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 66 that, in response to such execution, cause the processing device 66 to perform a set of operations, steps, methods, processes, algorithms, functions, techniques, etc. as described herein for the various embodiments.

In particular, the routing table building module 78 may include software instructions for instructing the processing device 66 to build routing tables for use in a STRAT network architecture within a data center or other similar network environment. Constructed routing tables may be stored in the memory device 68 or a database. In addition, when the routing tables are created by executing the operations associated with the routing table building module 78, the routing tables can be distributed to the plurality of switches 44 in the network environment 40. In this way, the switches 44 can route traffic within the data center in an efficient manner, as described in the present disclosure. Some of the traffic routing strategies can be controlled by the forwarding module 80.

The routing table building module 78 may differ from Link State protocols and known distributed Distance Vector (DV) algorithms like Bellman-Ford, RIP, or EIGRP in several important aspects:

a) Link State protocols distribute the network topology to all the nodes and use this information for routing computations at each node. The routing table building module 78 of the present disclosure is configured to distribute only the hop metric to every destination. Also, the Routing Table (RT) is constructed by the routing table building module 78 in real time.

b) Traditional Distance Vector algorithms send from each node a table to near neighbors that contain destination names (IP addresses) and updated hop count metric to that Destination. The forwarding module 80 is configured to send packets from each node to near neighbors, whereby the packets are small Packet Initiated Network Generation (PING) packets that are individually-updated per-destination (e.g., IP address) and have their own updated hop metric.

c) Proper off-shortest counts: Using per-destination PING packets, the routing table building module 78 is configured to add a capability to properly compute off-shortest hop counts by appending visited node names to the propagated PING packet. As PING packets are flooded through the network, each PING packet's path is restricted to avoid previously-visited nodes, preventing loops and hop miscounts.

d) Avoid count to infinity: Traditional Distance Vector algorithms perform Routing Table updates "in-place" (i.e., metrics can grow as well as decrease), which can lead to a well-known "count to infinity" problem. The routing table building module 78 of the present disclosure is configured to update metrics exclusively when they decrease. The routing table building module 78 can maintain separate Routing Tables and Forwarding Tables in memory or in a database associated with the memory device 68. When updates to the network topology occur, the routing table building module 78 may be configured to maintain a separate Routing Table with time-stamps. A Routing Table becomes an active Forwarding Table only when its construction is complete, thereby avoiding count to infinity problems.

e) As each node has full path visibility delivered to it by the PING packets, there is an option to construct k disjoint paths, which may be useful for Source Routing implementations.

f) The routing table building module 78 is further configured to maintain accurate entries for off-shortest paths, indicating hop counts to the Destination through all available ports at a node. This is different from EIGRP or other similar protocols, which explicitly exclude paths that could potentially lead to loops. Loop avoidance is described below with respect to the Forwarding Tables.

Utilizing Forwarding Tables for Packet Forwarding

The constructed routing tables created by the routing table building module 78 can be available to the switches 44 throughout the network environment 40. The switches 44 can use the routing table for routing data traffic. In addition, the switches 44 may be equipped with additional forwarding algorithms for forwarding data packets within the construct of the routing table information. The forwarding algorithms 80 stored in the memory device 68 may be distributed by the network interface 72 to the different switches 44 for execution of the forwarding algorithms 80, the details of which are described below. Also, portions of the forwarding algorithms may be stored in the packets themselves for guiding the switches 44 for forwarding the packets. Various forwarding strategies are described below.

The routing tables and forwarding tables described in the present disclosure provide improvements over conventional systems in that the safe (i.e., loop-free) Off-Shortest Paths (OSPs) use a distributed, computationally-efficient algorithm which is deployable at scale, and which is especially suited to a fabric employing a loosely structured or unstructured interconnect topology. However, the algorithms described with respect to the routing table building module 78 will also work on any network topology, including highly-structured ones like Clos, Fat Tree, Dragon Fly, Slim Fly, etc.

Loop avoidance may be accomplished by either or both of the following two methods:

a) If modest path diversity is sufficient, a packet Time-To-Live (TTL) counter can be set to "shortest path+2." Then, the respective switches 44 utilize the forwarding table to monitor that packet forwarding is not allowed through any interface that has larger hops to destination than the current TTL value.

b) If much higher path diversity is desired, each packet accumulates a PathPort list of previously visited nodes, and forwarding is explicitly prohibited to nodes that have already been visited.

Typical congestion avoidance algorithms require multi-node communication, and some require message passing between end-point servers. Such approaches do not work well in data center environments where traffic loads change in rapid and unpredictable fashion. However, the routing table building module 78 of the present disclosure is configured to operate to efficiently and rapidly adapt to network congestion and connectivity failures using only local (switch-located) metrics, without requiring congestion notification algorithms.

Legacy protocols, like EIGRP with its "feasible successors," rely on explicitly topologically loop-less routes for achieving Multi-Cost, Multi-Path based diversity for supplementing Shortest Path routing. This severely limits the diversity of forwarding possibilities to those only which warrant the loop-less routing. However, the forwarding module 80 in the present disclosure is configured to gradually extend the forwarding potential to all the available interfaces, eliminating the danger of getting packets caught in loops by making them avoid entering into a loop in the first place. This is done by packets recording their path through the traversed nodes and consciously avoiding being forwarded through the interfaces leading toward already-visited nodes.

Congestion avoidance described in the present disclosure is an improvement over conventional algorithms and is performed without the need to know the loaded status of any links beyond the immediately local ones. The lack of knowledge of the global state of loads and links farther down the route may be supplemented by a richer diversity of possible forwarding interfaces. The same forwarding decisions may be repeatedly made based on local load status before every hop toward the destination.

Operating Principles

The embodiments of the present disclosure encompass both a new simple and reliable routing algorithm (e.g., created by the routing table building module 78) for building the RTs and new more efficient forwarding protocol (e.g., as defined by the forwarding algorithms 80) for achieving ultimate forwarding diversity.

The essence of the Packet Initiated Network Generation (PING) algorithm, as described in more detail below, can be illustrated by envisioning the working of famous Dijkstra shortest path algorithm as a swarm of scouts being sent out from a source node to discover and report a shortest path to a destination node.

Using PING Algorithm to Build Routing Tables

In the following example, it is assumed that all network links are bi-directional, such that any path discovered by the routing algorithm can be traversed in reverse by the data carrying packet during forwarding. It is also noted that a single RT entry is needed per unique graph edge. For example, there may be multiple physical links comprising a unique point-to-point connection (e.g., graph edge) which may be combined into a single entity (e.g., using Link Aggregation Group).

Each network node has its RT for forwarding to all possible destinations through all possible links or interfaces, where a RT value is initially set to infinity for all possible interfaces and is set to zero for itself. This node, which becomes an eventual destination to all other nodes, advertises its existence to every near neighbor by sending a PING equipped with just its name and zero metric (or zero hop count).

The receiving node performs the following algorithmic actions:

Notes the interface on which the PING arrived;
Increments the delivered metric (e.g., hop count) with a metric to get to the sender node (or increments hop count to the destination by one hop);
Updates a stored metric (e.g., optional according to Option 1 or Option 2 below) based on the relation between the incremented and already-stored metric; and
If the stored metric is updated, resends a PING with an incremented metric;
otherwise, terminates.

The PING algorithm, which may be performed by the routing table building module 78, includes several options, which may trade off convergence time and extent of Off-Shortest Path (OSP) entries in the RT, where all PINGs may be processed with the "poison reverse" policy (i.e., never resend a packet on the same interface that the PING came in on):

1. The PING algorithm stores the incremented metric to destination and re-sends an updated PING to near neighbors either if a new metric is smaller than the metrics associated with all other interfaces, or if the newly acquired metric is the same as the existing one but arrived through the alternative interface; otherwise PING is terminated at this node and nothing is updated. This creates RTs with guaranteed shortest-path (SP) entries (e.g., EIGRP's "successors"). Possible OSP entries (e.g., EIGRP's "feasible successors") may be established subsequently by consulting the DVs of adjacent neighboring nodes. The remaining healthy interfaces may be used indiscriminately for forwarding the packets as a Last Resort (LR) alternative to being dropped.

2. The algorithm stores an incremented metric to destination and re-sends the PING with the updated metric to near neighbors if the new metric is smaller than the metric associated with only the receiving interface (not 'all' as in Option 1); otherwise PING is terminated at this node and nothing is updated. This creates tables with guaranteed SP and OSP entries. Burden of consulting the DVs of adjacent neighboring nodes for possible OSP entries is eliminated because OSP entries are directly produced by the PING algorithm. Again, the remaining healthy interfaces may be indiscriminately used for forwarding as LR alternative to packets being dropped. Option 2 provides reliable metric entries to all remaining LR interfaces by enforcing the loop-less PING propagation. This allows to forward packets through LR interfaces discriminately based on their now reliable metric.

In a process of PING propagation, a broadcast is sent through all healthy interfaces except the one that the PING arrived through ("poison reverse"). While broken links will be inherently registered as unavailable in the process of PING re-broadcasts, temporary overload of some egress interfaces interferes with reliable PING re-broadcasts. This can be alleviated by keeping the PING at the switching node until the overloaded interfaces are freed, and then PING can be finally sent through this freed interface, thus ensuring the reliability of flooding the network with the PING packets. The PING packets are very short, and overall network bandwidth impact is negligible.

Option 1: Using PING Algorithm for Building Shortest Path (SP) Routing Table (RT)

Figure 6:
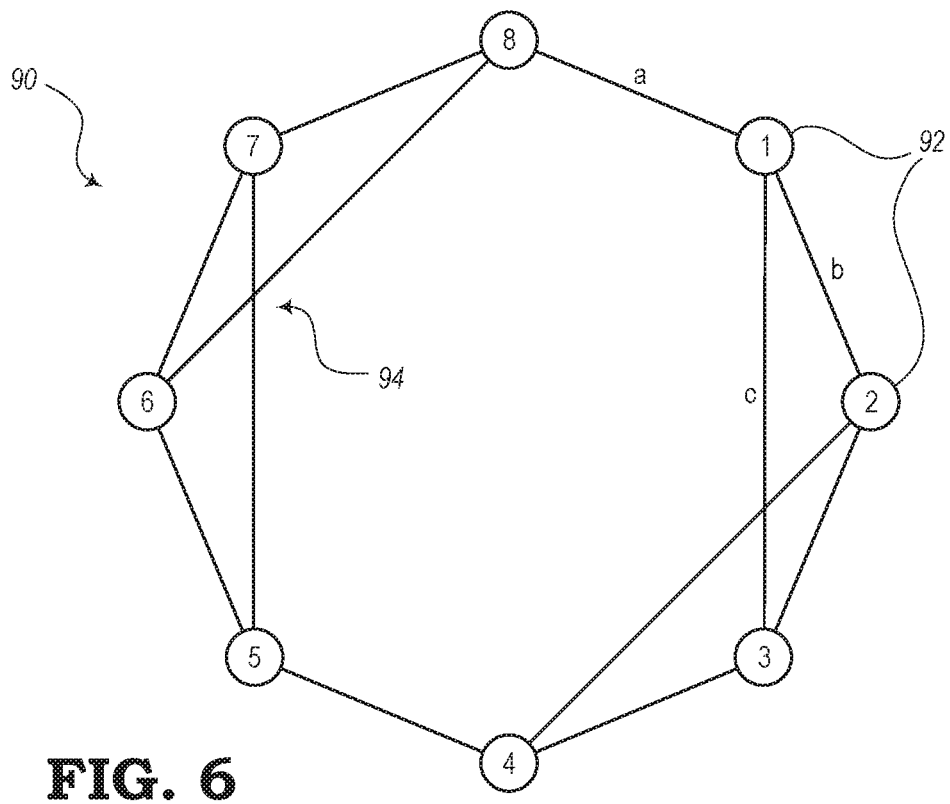
FIG. 6 is a diagram illustrating switches arranged in one example of a STRAT network architecture within a data center, according to various embodiments.

FIG. 6 is a diagram illustrating another example of an arrangement 90 (e.g., a STRAT network architecture) within a data center or other network environment (e.g., network environment 40 of FIG. 3). In this simple arrangement 90, there are only eight switches 92 shown in a simplified manner for illustrative purposes. Each switch 92 has three ports and three links 94 for connection with other switches 92. FIG. 6 may be used to illustrate an Option 1 with a simple 8-node, 3-port example.

Starting with a PING originating node, the PING algorithm, in the process of the PING propagation through the network, traces a kind of spanning tree that includes all nodes except for nodes re-appearing in the spanning tree when the PING re-enters the node. For simplicity, a distance-only metric will be considered for routing in this example and other examples mentioned below.

Figure 7A:
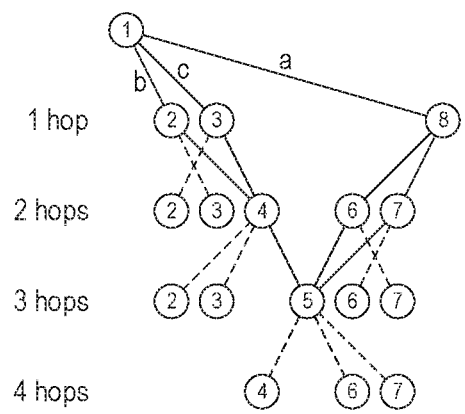
FIGS. 7A-7H are diagrams illustrating hop configurations for various switches of the STRAT network architecture of FIG. 6, according to various embodiments.
Figure 7B:
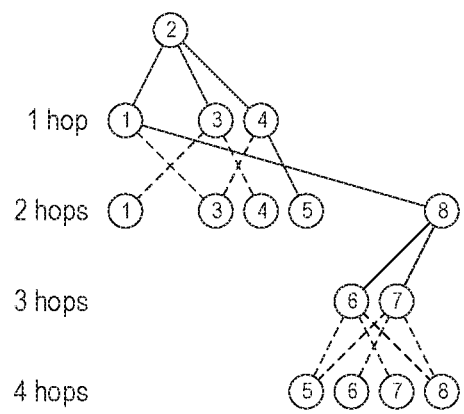
Figure 7C:
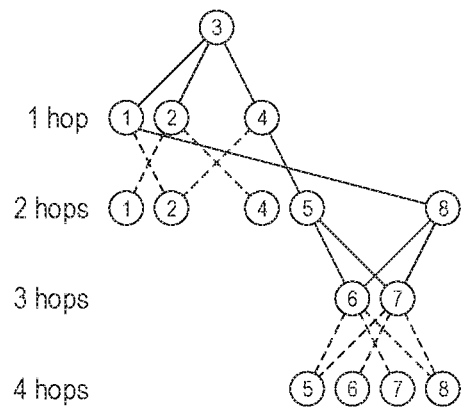
Figure 7D:
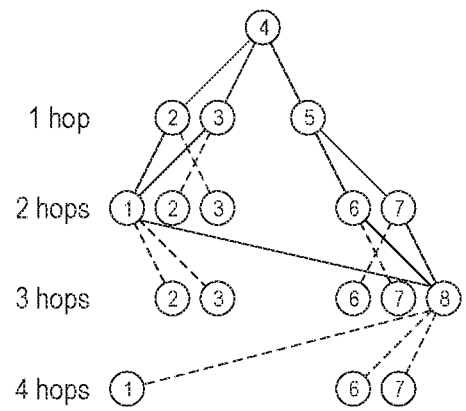
Figure 7E:
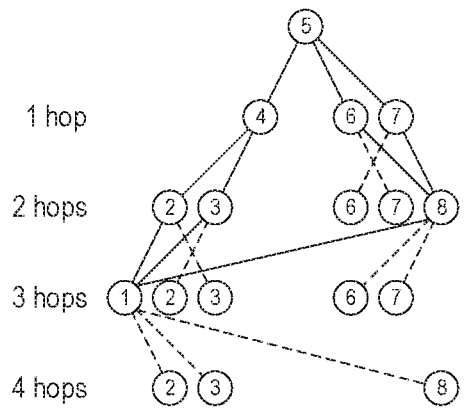
Figure 7F:
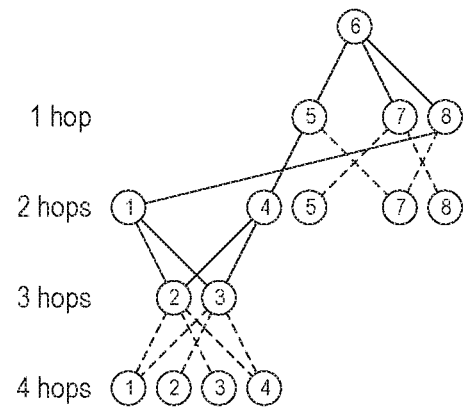
Figure 7G:
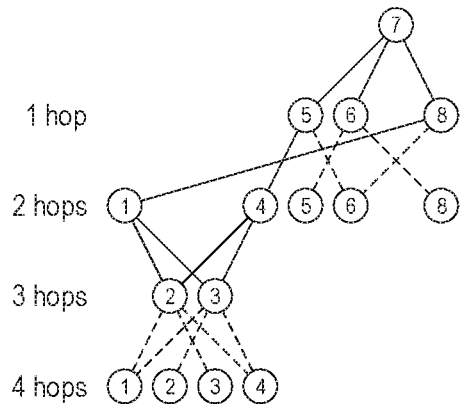
Figure 7H:
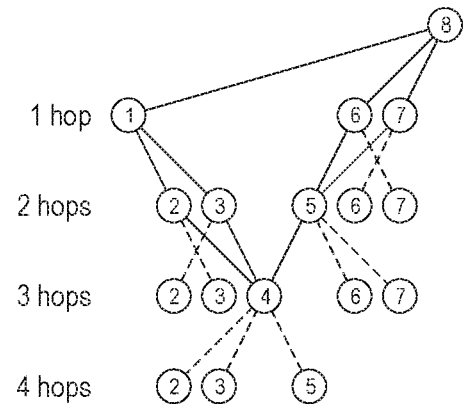

FIG. 7A-7H are diagrams illustrating hop configurations for various switching nodes 92 of the arrangement 90 of the STRAT network architecture. In FIG. 7A, node 1 is recognized as being the sending node; in FIG. 7B, node 2 is recognized as being the sending node; in FIG. 7C, node 3 is recognized as being the sending node; and so on. In the example of FIG. 7A, a first possible hop from node 1 is shown leading to nodes 8, 2, or 3, based on the links 94 between nodes shown in FIG. 6. A first link is designated as "a" in FIGS. 6 and 7A and is the link 94 between nodes 1 and 8; a second link is designated as "b" in FIGS. 6 and 7A and is the link 94 between nodes 1 and 2; and a third link is designated as "c" in FIGS. 6 and 7A and is the link 94 between nodes 1 and 3.

A second hop in FIG. 7A shows various hop possibilities from nodes 2, 3, and 8, which at this stage may lead to nodes 2, 3, 4, 6, or 7, without returning back to the originating node 1. A third hop from nodes 2, 3, 4, 6, and 7 can then lead to nodes 2, 3, 5, 6, or 7, while avoiding the poison reverse situation and avoiding the originating node 1. A fourth possible hop is shown as leading to nodes 4, 6, or 7. The solid lines indicate a legitimate possible hop that does not get terminated on arrival, i.e., PING will be re-broadcast. A dashed line indicates terminal links, i.e., PING will be terminated on arrival.

After each hop, PING arrives to the nearest adjacent neighboring nodes of its sending node. By doing so, it immediately provides for true Shortest Path (SP) metric. SP entries are shown in the Routing Table (RT) 100 of FIG. 8. The SP entries are related to PING originating nodes as future destinations for RTs of neighboring nodes. PINGs with incremented hop count are being re-sent to the near neighbors through all healthy interfaces except the one that PING arrived through ("poison reverse") either if a new metric is smaller than the metrics associated with all other interfaces, or if the newly acquired metric is the same as the existing one but arrived through the alternative interface. Otherwise, PING is terminated at this node and nothing is updated. The last terminal hop is drawn as dashed line in FIGS. 7A-7H.

Figures 8, 9:
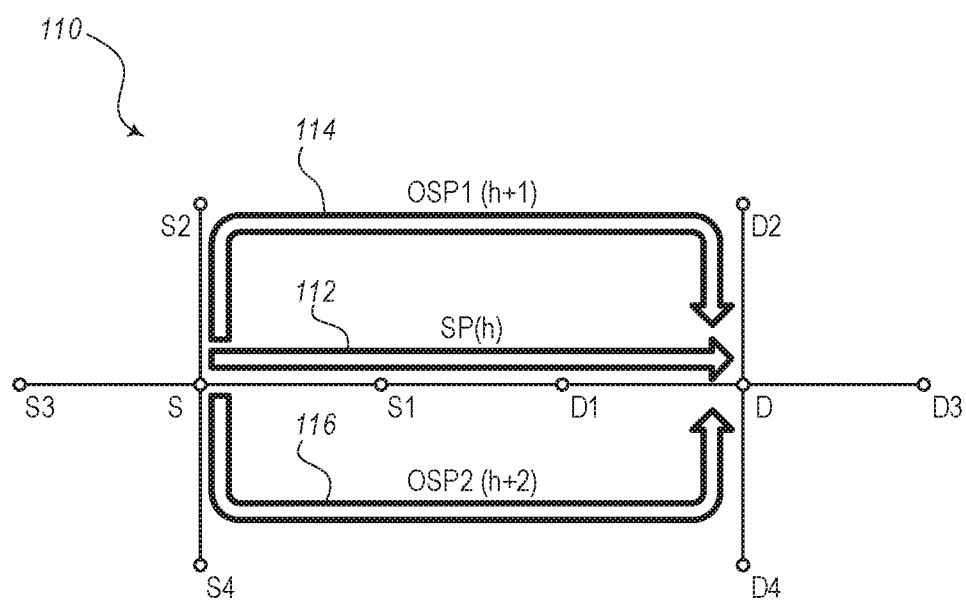
FIG. 8 is a routing table illustrating network propagation information for the STRAT network architecture of FIG. 6, according to various embodiments.
FIG. 9 is a diagram illustrating various paths from a source node to a destination node, according to various embodiments.
Figure 12A:
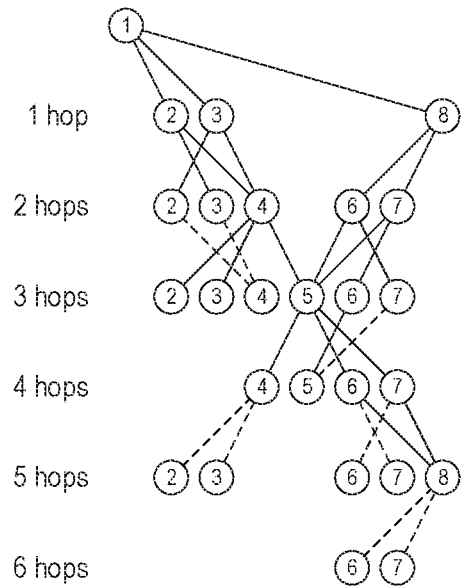
FIGS. 12A-12H are diagrams illustrating updated hop configurations for various nodes of the network having the STRAT configuration of FIG. 6, according to various embodiments.
Figure 12B:
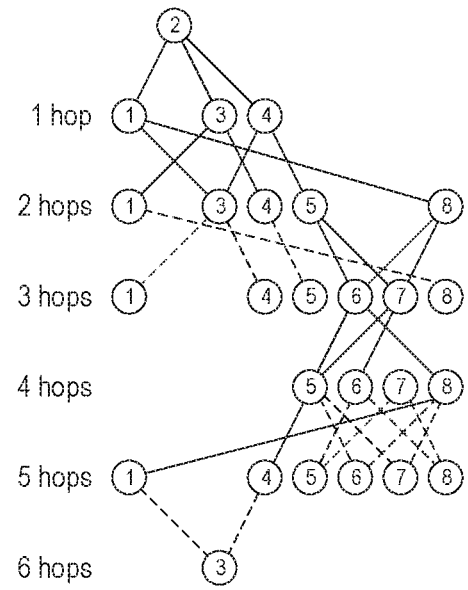
Figure 12C:
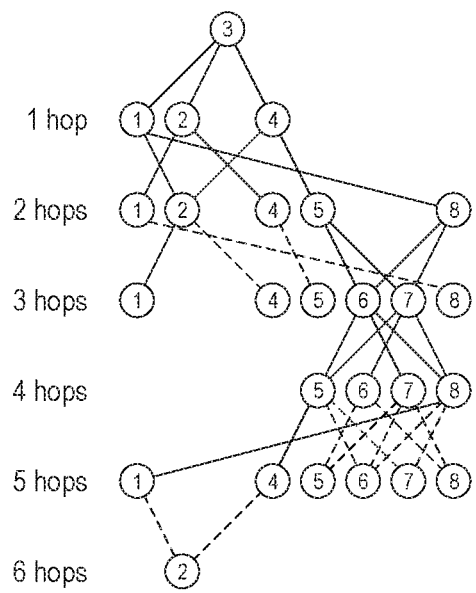
Figure 12D:
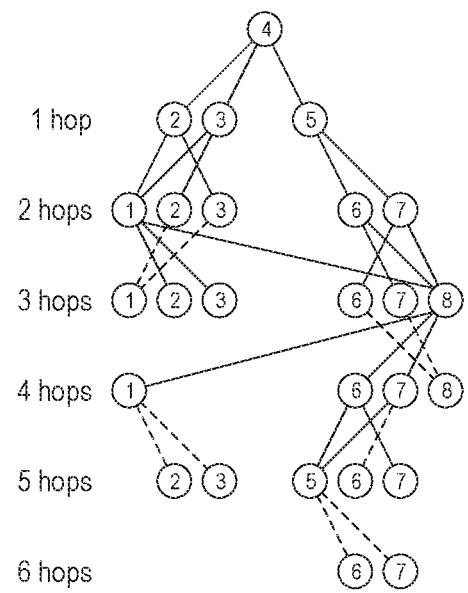
Figure 12E:
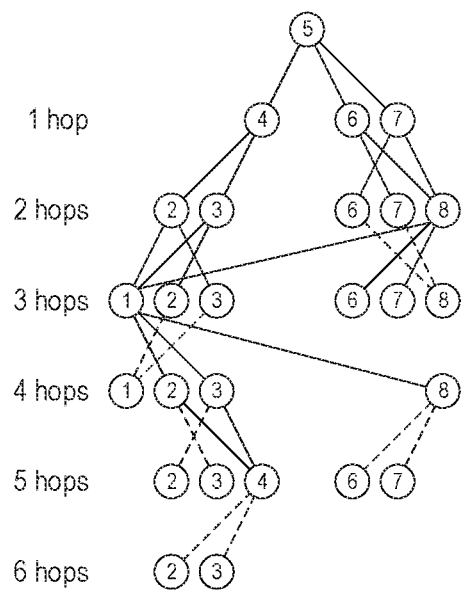
Figure 12F:
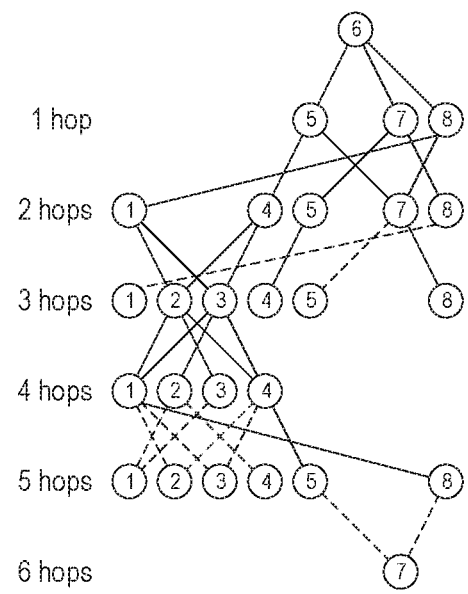
Figure 12G:
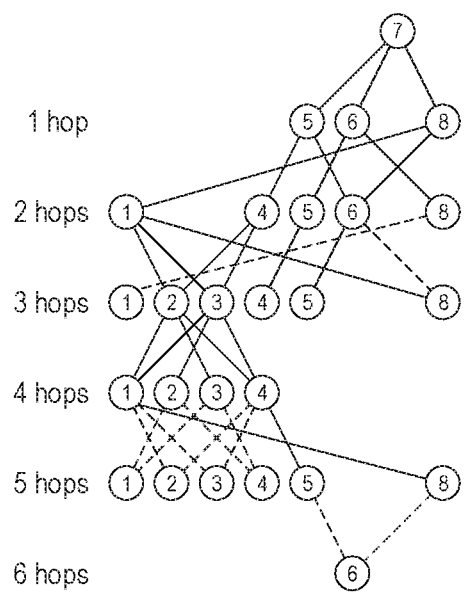
Figure 12H:
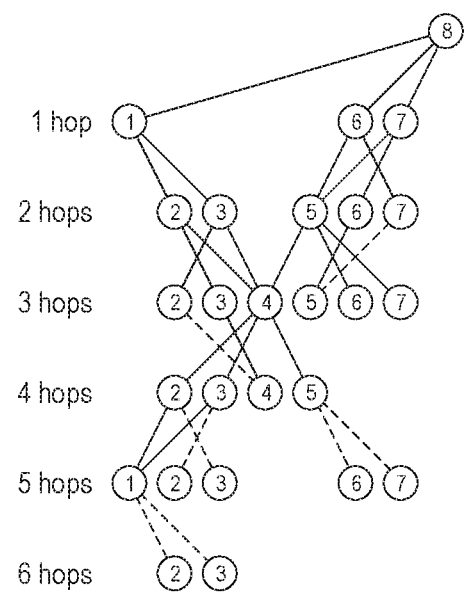

FIG. 8 is a Routing Table (RT) 100 illustrating an example of network propagation information for the arrangement 90 of FIG. 6. The source node (e.g., one of nodes 1-8 shown in FIG. 6) is designated as "S" in the RT 100 (e.g., S=1 represents node 1 being the source node) and the destination node (e.g., nodes 1-8) is designated as "D" in the RT 100. Also, the RT 100 includes a set of three columns under each source node, whereby each column designates the three possible links from that source node. For example, under S=1, the first column represents hops beginning with the link "a" (i.e., between node 1 and node 8) shown in FIGS. 6 and 7A; the second column represents hops beginning with the link "b" (i.e., between node 1 and node 2) shown in FIGS. 6 and 7A; and the third column represents hops beginning with the link "c" (i.e., between node 1 and node 3).

Every node originates a PING. In a few hops (not more than one hop bigger than the network diameter), the Shortest Path (SP) RT 100 (e.g., EIGRP's "successors") for the whole network 90 is completed. As shown in FIG. 8, the RT 100 includes zeros corresponding to the hop metric referencing nodes to themselves and infinities ("∞") are inserted to designate non-SP interfaces. The SP RT 100 may be used for SP forwarding with zero entries referencing to the nodes themselves removed from them and infinities replaced by blank FT cells. Although SP routing may not necessarily be used at this point, an OSP part of Option 1 may be used with the embodiments of the present disclosure.

As an example, the RT 100 includes three columns under S=1 (i.e., where node 1 is the source node). With respect to D=4 (i.e., where node 4 is the destination node), there are three entries within the three columns under S=1, the three entries including ∞, 2, 2.

As shown in FIG. 7A regarding source node 1, the first link "a" (represented in the first column under S=1 in the RT 100 of FIG. 8) includes a first hop to node 8, a second hop to nodes 6 and 7, a third hop to node 5, and a fourth hop to node 4. In this first case, the four hops to node 4 is not the shortest route and thus the entry into the RT 100 is ∞. The second link "b" (represented in the second column under S=1 in the RT 100 of FIG. 8) includes a first hop to node 2 and a second hop to node 4. In this second case, the two hops to node 4 is the shortest route and thus the entry into the RT 100 is 2. Similarly, the third link "c" (represented in the third column under S=1 in the RT 100 of FIG. 8) includes a first hop to node 3 and a second hop to node 4. In this third case, the two hops to node 4 is also a shortest route and thus the entry into the RT 100 is 2.

Option 1 Extended to Off-Shortest Path (OSP): OSP RT Build with SP RT in Place

FIG. 9 is a diagram illustrating various SP and OSP routes 110 from a source node to a destination node. Since the RT 100 of FIG. 8 only includes SP routes, it would be beneficial to further extend the RT to include Off-Shortest Path (OSP) routes. The processes described in the present disclosure include steps of obtaining OSP RTs whereby SP RTs are already in place, such as by revising the RT 100 to include the OSPs. OSP entries in the table of FIG. 8 may be obtained in two different ways. First, the SP(h) route 112 may be calculated from a source node S to a destination node D through neighboring nodes 51 and D1, where "h" is the shortest number of hops from S to D. Second, alternate OSP routes 114, 116 may be calculated.

An OSP1 route 114 involves the interface leading to the neighbor S2 of the source node S, whose SP metric-to-destination, or M(S2→D), does not exceed the metric from node S to destination, or M(S→D), plus metric M(S2→S) to get from S2 to S. The OSP1 route 114 of OSP RT obtained under this condition ensures that a packet forwarded through this newly obtained OSP1 interface 114 can be forwarded further to the destination by the SP FT alone. The discovery of OSP1 entries is accomplished by requesting and consulting the DVs of adjacent neighboring nodes. Discovered OSP1 entry 114 is a sum of M(S→S2) and M(S2→D), which in the simplest case of distance-only metric reduces to SP distance plus one hop, or h+1 (as indicated in the OSP1 brackets).

A second alternate route include an OSP2 route 116, which involves the interface leading to the neighbor S4 of the source node S, whose SP metric to destination, or M(S4→D), equals the metric from node S to destination M(S→D) plus metric M(S4→S) to get from S4 to S, but only if there exists an alternative SP interface from that neighboring node S4 to the destination node D with the same metric M(S4→D). OSP2 entries of OSP RT obtained under these conditions ensure that a packet forwarded through this newly obtained OSP2 interface 116 can be forwarded further to the destination by the SP FT alone. The discovery of OSP2 entries is again accomplished by requesting and consulting the DVs of adjacent neighboring nodes. Discovered OSP2 entry 116 is a sum of M(S→S4) and M(S4→D), which in the simplest case of distance-only metric reduces to SP distance plus two hops, or h+2 (as indicated in the OSP2 brackets).

FIG. 10 is an embodiment of a Routing Table (RT) 120 illustrating shortest paths and off-shortest paths and is an update to RT 100 of FIG. 8. OSP RT obtained from SP RTs already in place according to Option 1 is shown in the routing table 120. Many of the SP RT entries in OSP RT are inherited from SP RT of FIG. 8 and are indicated by bold characters. OSP1 entries are inherited from the OSP RT and are indicated by italicized characters. OSP2 entries are inherited from the OSP RT and are indicated by underlined characters. For example, the number of hops from node 1 to node 4 (as described above with respect to FIG. 8) is an OSP2 path through node 8 that include four hops and is entered in the RT 120. It should be noted that fewer infinities ("∞") are left in the OSP RT 120 of FIG. 10 compared to the SP RT 100 of FIG. 8. It may also be noted that the OSP RT entries outnumber the EIGRP's "feasible successors" because there is no constrain for forwarding to be explicitly topologically loop-less.

Both kinds of OSPs (OSP1 and OSP2) prohibit the immediate looping back to the previous node by conditions stated above, but potential forwarding loops may still occur farther down the path. Industry standard Time-to-Live (TTL) mechanisms may be used to discard packets caught in the loop based on a pre-set limit of allowed number of hops. This method may prevent loops in mesh networks by setting packet TTL limit to h+2 (h being the shortest path distance between Source and Destination) when a packet first enters the network. The TTL count may be decremented by one with every hop and the packet may then be discarded when TTL count is exhausted. This still allows a packet to take paths with h, h+1, and h+2 hop count metrics, which provides good path diversity in mesh networks. However, this metric may be considered to be too radical of a measure, whereby TTL can unduly discard packets which happen to top off the TTL limit while loop-lessly making their way to destination through the succession of OSP1 and OSP2 routes.

According to some embodiments, a potentially better way to prevent packets from getting caught in the forwarding loops is to prohibit them from ever entering the loop in the first place. In other words, another strategy may include prohibiting the packets from visiting any node more than once on their way to a destination. This second method is more complex but provides substantially improved overall performance when performing individual packet forwarding. Loop prevention is realized by providing the packet with a "PathPort," which is carried with the packet and may be defined as a recorded path on its way to a destination or as a log of already-visited nodes. Loop prevention is accomplished by prohibiting packet forwarding through any interface connecting to such an already-visited node. With this method, more expanded path diversity can be achieved by setting TTL to h+3 or higher.

FIG. 11 is a flow diagram illustrating a method 130 for executing a packet forwarding algorithm utilizing the PathPort. The method 130 describes the workings of a forwarding protocol, according to various embodiments of the present disclosure. In the illustrated embodiment, nodes may be referred to as Top of Rack (TOR) switches (e.g., TOR switches 44 shown in FIG. 3), to reflect that they may be configured for hosting a plurality of servers (e.g., servers 46) under them. The healthy and under-loaded interfaces are defined as available if they are leading to the neighboring nodes which are not logged in the PathPort as already-visited and if the interface hop count metric is not exceeding the packet TTL. Availability of interfaces or links at each of the transient TOR switches is a condition that may be considered for successful forwarding of the packet. If there are no available interfaces, the packet must be dropped.

The method 130 includes allowing a source server to send a packet to its host TOR switch, as indicated in block 132. Then, the method 130 proceeds to decision diamond 134, where it is determined if the destination server is hosted by this TOR switch. If so, the method 130 proceeds to block 136, which indicates that the packet is delivered to the destination server. If not, the method 130 goes to decision diamond 138, where is it determined if there are any interfaces (i.e., links) available. If not, the packet is dropped, as indicated in block 140. If there are interfaces available, the method 130 proceeds to decision diamond 142, which indicates that it is determined whether the available interfaces are of a shortest path (SP) route. If not, the method 130 determines if the available interfaces are of OSP1 (diamond 144) or OSP2 (diamond 146) routes. If it is determined that the available interfaces are not SP, OSP1, or OSP2, then the method 130 determines that the available interfaces are of a Last Resort (LR) path. After determining if the path is SP, OSP1, OSP2, or LR, then the method 130 proceeds to block 148, which indicates that the least-loaded interface to the next TOR switch is selected. As indicated in block 150, the current TOR is logged as being visited. As indicated in block 152, the packet hops to the next TOR and the method 130 then returns to decision diamond 134 to repeat the processes for the next hop.

At every TOR on their way to the destination, the packets are looking for any available SP interfaces first, then only if none is found, for any available OSP interfaces of the first kind (i.e., OSP1), then only if none is found, for any available OSP interfaces of the second kind (i.e., OSP2) and, finally, only if neither SP nor OSPR interface is found available, any available interfaces beyond SP and OSP. That is, the Last Resort (LR) interfaces (labeled at infinity ("co") in the OSP table 120 of FIG. 10) are selected, until further processing can be made. Out of the available interfaces that are found, the least-loaded interface is selected for forwarding (e.g., block 148) and the current TOR is logged in the PathPort as "already-visited" (e.g., block 150). Also, the packet TTL may be decremented by one at this step.

The forwarding protocol of the present disclosure utilizes the RTs to provide an efficient routing strategy, particularly in the case when high traffic loads are overloading, first SP interfaces and then OSP interfaces. The Last Resort (LR) interfaces, which allow to avoid the dropping of packets, enable a packet to be sent through any of the least-loaded interfaces of the remaining healthy LR interfaces beyond the SP and OSP interfaces. The use of LR interfaces increases the number of prospective interfaces available for packet forwarding as the traffic becomes extremely heavy. As a result, the forwarding strategy increases network throughput by providing ultimate routing diversity, all the way to the absolute limit of the network capacity. Also, by avoiding the necessity to drop packets, the present forwarding strategy can be achieved at the simple cost of a few extra hops and a little latency, while still being limited within a reasonable degree by TTL enforcement.

Option 2: OSP RT Build by a Loop-Less PING Process

The present disclosure further provides another option (i.e., Option 2), which may be configured to extend SP RT construction to include OSP routes using a different criterion for termination of PING re-sending. Restating the SP criteria, the updated PING is re-sent to near neighbors either if a new metric was smaller than the metrics associated with all other interfaces, or if the newly acquired metric is the same as the existing one but arrived through the alternative interface. Otherwise, PING may be terminated at this node and nothing is updated. Thus, SP RT entries for interfaces other than having SP metric are still as they were (e.g., initiated at infinity). In OSP RT, the interfaces may be updated with a metric delivered by the PING through them.

The OSP routing protocol described in the present disclosure may be configured to build a RT by the PING algorithm and recording the best delivered by PING and incremented metric for each receiving interface. The new PING re-broadcast termination criteria is to terminate the re-broadcast only when a metric delivered by PING through receiving interface is not any better than a metric that already had been delivered through the same interface earlier and is already stored in OSP RT cell corresponding to this receiving interface, which results in no update in the OSP RT in this case. As a result, OSP RT will contain best metric values to the specific destination delivered by PING through each interface, thus fully populating all the healthy interfaces with finite metric values and eliminating the burden of requesting and consulting DVs of neighboring nodes.

To ensure the loop-less PING propagation during the build of OSP RTs (e.g., utilizing the same loop-less forwarding technique described above), the forwarding strategy may include equipping the PING with the PathPort mentioned above. This will prevent the PING from re-entering the already visited node and ever entering the loop, and, hence, ensure the loop-less PING propagation all the way through the network.

Figures 13, 14:
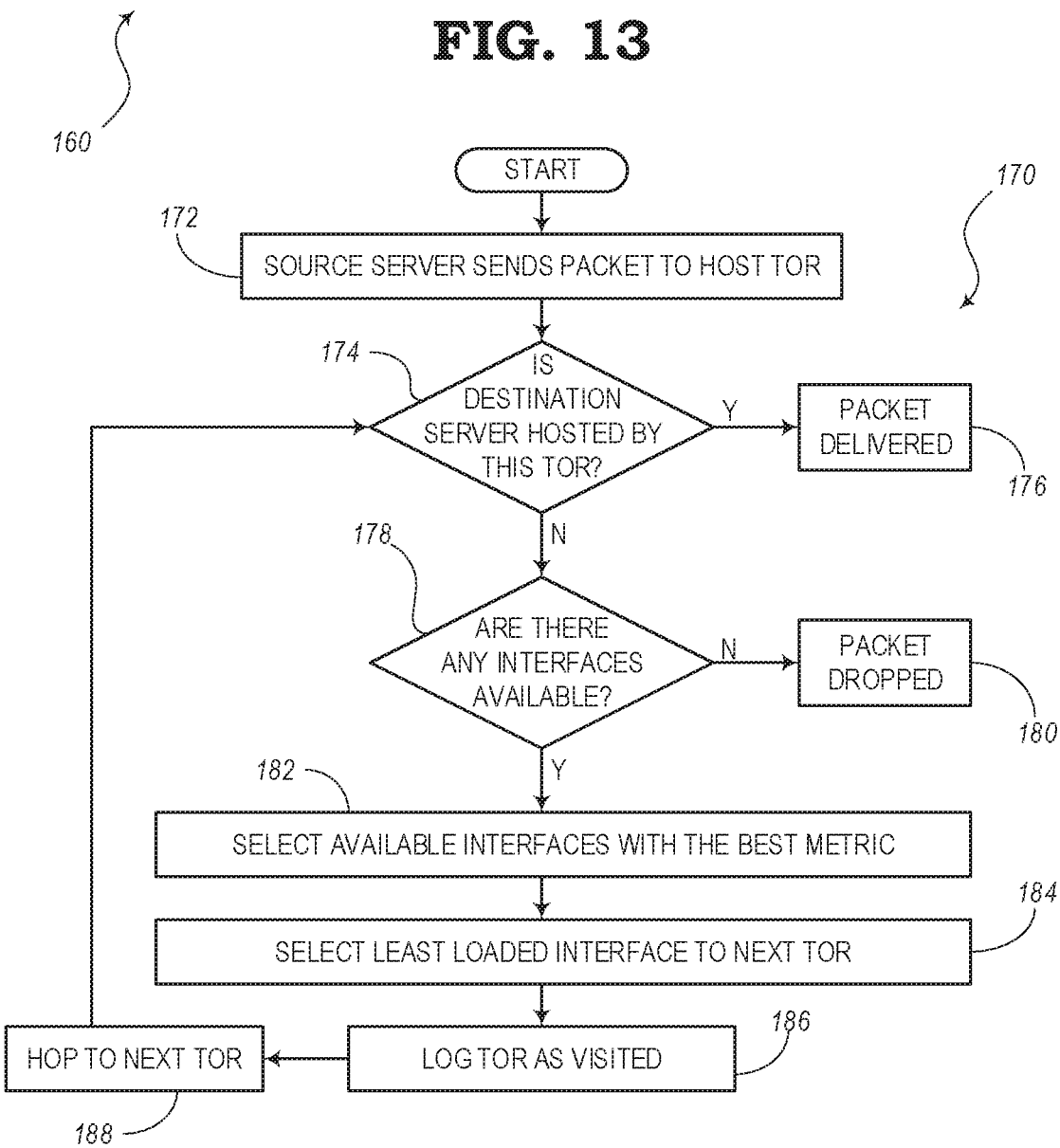
FIG. 13 is a further-updated routing table incorporating loop-less propagation, according to various embodiments.
FIG. 14 is a flow diagram illustrating a method for executing another packet forwarding algorithm, according to various embodiments.

FIGS. 12A-12H are diagrams illustrating hop configurations including six cycles of loop-less propagation for various starting nodes of the network arrangement 90 shown in FIG. 6. The hop configurations show the results of utilizing an OSP RT build by the loop-less PING process. Also, FIG. 13 is a resulting OSP Routing Table (RT) 160, updated from the RT 100 of FIG. 8 and RT 120 of FIG. 10. The RT 160 includes Shortest Path (SP) shown by bolded characters (as originally entered in RT 100), Off-Shortest Path (OSP) according to a first option (i.e., OSP1) and shown by italicized characters (as originally entered in RT 120), and OSP according to a second option (i.e., OSP2) shown by underlined characters (as originally entered in RT 120). Also, Last Resort (LR) entries in the routing table 160 are shown by bolded, italicized, and underlined characters, which are newly updated entries.

PINGs with incremented hop count are re-sent to the near neighbors through all healthy interfaces except the one that PING arrived through ("poison reverse"; also duplicated by PathPort) if a new metric is smaller than the metric associated with the receiving interface. Otherwise, PING is terminated at this node and nothing is updated. The last terminal hop is shown in FIGS. 12A-12H as dashed lines.

OSP Forwarding after the Loop-Less PING Process

FIG. 14 is a flow diagram illustrating an embodiment of a method 170 for executing another packet forwarding algorithm. In this method 170, a forwarding strategy may be rather straight forward. The forwarding strategy may include a packet looking for an available interface with the best metric and forwarding through a least-loaded interface. For example, the method 170 may operate in a manner similar to the method 130 described above with respect to FIG. 11, in which the packet forwarding algorithm with SP, OSP1, OSP2, and LR routing opportunities is used. TTL can be utilized with the packet forwarding with OSPR after the loop-less PING process to limit the number of extra hops and limit the latency.

The method 170 includes the step of a source server sending a packet to its host TOR switch, indicated in block 172. It is then determined if the destination server is hosted by this TOR, as indicated in decision diamond 174. If so, the method 170 goes to block 176, which indicates that the packet is delivered. Otherwise, the method 170 proceeds to decision diamond 178, which includes the step of determining if there are any interfaces available. If no interfaces are available, the packet is dropped, as indicated in block 180. If there are available interfaces, the method 170 proceeds to block 182, which indicates that the available interfaces with the best metric are selected. Then, the method 170 includes selecting a least-loaded interface to the next TOR to which the packet is to hop, as indicated in block 184. The current TOR is then logged as being visited (as indicated in block 186) and the packet hops to the next TOR (as indicated in block 188).

Regardless of which way the OSP RTs are built for obtaining the forwarding tables, the forwarding protocol can be equally successful for delivering packets to their respective destinations even when traffic load grows all the way to the ultimate limit of the network throughput capacity—all for the cost of some extra hops.

Initialization and Updates (Scheduled and Triggered)

Both for initialization of the network and any updates (scheduled or triggered by link status changes), a new copy of RT is created with routes initiated with infinities. To distinguish between scheduled and triggered updates and subsequently to give the priority to the triggered ones, PathPort of every PING belonging to both initialization and an updated PING is stamped with the time when the PING algorithm was started. This time stamp allows the processing device 66 to distinguish between two concurrent PING propagations, giving priority to the newer one (according to time stamps) and discarding the older-dated RT. This procedure eliminates any potential trouble similar to "counting to infinity" encountered in the DV routing protocol by preventing two concurrent PING propagations started by different events from overlapping in time and interfering with the integrity of the RT build-up. Instead, by giving priority to the later-started PING, both root causes of two concurrent PING processes—old and new—are addressed and eliminated. Each RT being built is associated with the time stamp issued at the starting of the PING process. This RT is continually built by PING propagations with matching time stamps, and a hold-off timer is reset with every new PING arriving at a node. When the PING algorithm naturally stops, the hold-off timer in a node will expire and the newly built RT is copied into the active FT state.

While RT are being re-built, due to high efficiency and robustness of the forwarding protocol of the present disclosure, link failures are handled extremely graciously: every time a link fails, packets meant to be routed through the un-healthy and un-available interface have ample opportunities for re-routing through the plentiful alternative forwarding interfaces, again, for the price of potentially more hops to the destination.

As for updates, both scheduled and triggered, the simplicity and reliability of the routing algorithm allows to re-build the RTs from scratch in just a few hops, specifically, a few more than the network diameter (e.g., the actual number may actually be network topology dependent), while the above-mentioned robustness of the forwarding protocol greatly relieves the urgency of accommodation for the failures.

New Forwarding Protocol Performance

Figure 15:
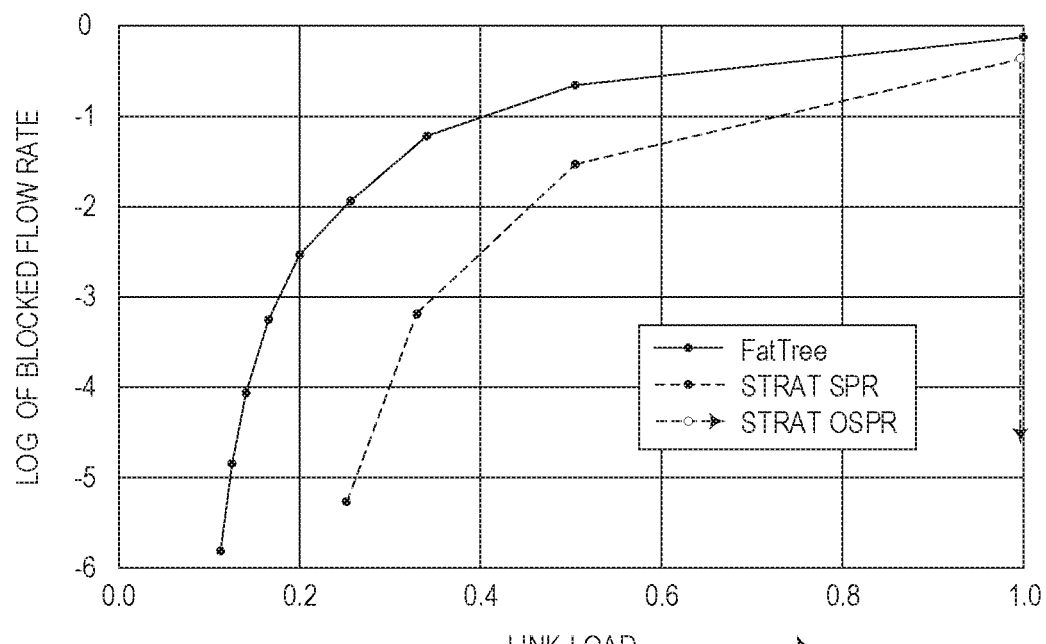
FIG. 15 is a graph comparing blocked flow rates of different network architectures with respect to different link loads, according to various embodiments.

FIG. 15 is a graph 190 showing blocked flow rate versus link load for comparing various network architectures. For example, the "blocked flow rate" parameter is the fraction of flows that are blocked. To evaluate the performance of the forwarding protocol of the present disclosure, network throughput of flows was computed for both 3-level FatTree and STRAT networks of the present disclosure supporting the same number of servers (e.g., 65,536 servers). Both FatTree and STRAT networks under consideration were built from identical radix 64 switches, with flat STRAT network comprised of 4096 TOR switches (versus 5120 switches in FatTree) hosting 16 servers each.

Results of the throughput computation are presented in the graph 190 of FIG. 15. For example, the graph 190 shows the logarithm of the Blocked Flow Rate vs Link Load for FatTree (solid line), STRAT with Shortest Path Routing (SPR) (dashed line) and STRAT with Off-Shortest Path Routing (OSPR) (unfilled dot). In addition to the advantage of the STRAT topology over FatTree with SP forwarding, as indicated above, another advantage of STRAT networks with OSPR of the present disclosure can also be seen from graph 190 as being more efficient. Particularly, there are no observed blocked flows at a Link Load of 1.0, shown as the single unfilled dot.

Forwarding at the Cost of a Few Extra Hops

Figure 16:
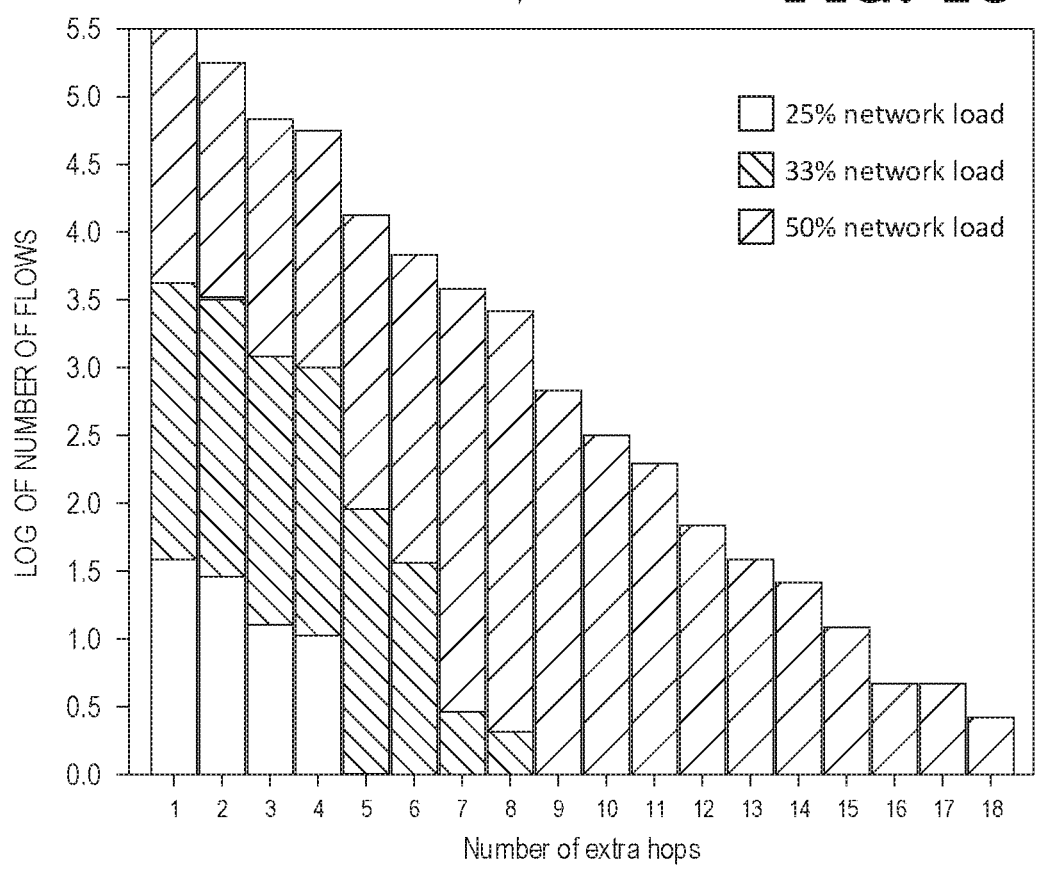
FIG. 16 is a histogram illustrating extra hops needed to reach a destination for switches arranged in the STRAT network architecture, according to various embodiments.

FIG. 16 is an example of a histogram 200 illustrating the number of extra hops needed to reach a destination when the STRAT arrangement of the present disclosure is utilized with the RTs and FTs described herein. To be specific about how many more extra hops a packet would need to travel to successfully reach its destination, FIG. 16 shows the histograms of the decimal logarithm of Number of Flow versus the number of extra hops needed for Link Loads of 25%, 33%, and 50%. It is seen in histogram 200 that even at extremely high Link Load (50% network load), the OSP forwarding protocol is able to deliver all the flows without packet drops for the latency cost of some of the packets having to endure up to 19 extra hops on their way to the destination. Again, when necessary, allowable latency can be defined by enforcing certain TTL parameters.

Composite Metrics

There are composite and more complex metrics other than just simple hop count, which might incorporate link bandwidth, delay, cost (monetary), load, and reliability. For example, EIGRP adds together weighted values of different network characteristics (e.g., delay, bandwidth, reliability, load, etc.), but not hop count. Only delay and bandwidth might be used by default. Hop count may be used as criterion for rendering the router unreachable if hop count reaches a predefined default maximum of 100, for instance. The weighted values are added in order to calculate a metric for evaluating the path selection.

It is obvious that metrics incorporating the link bandwidth can prioritize a two-hop route over a single-hop route, provided the former had a higher bandwidth. Consequently, introduction of composite metrics might re-prioritize some interfaces of the RTs and FTs which were based on hop count alone, as well as introduce much finer granularity of metric values than in comparatively more discrete cases based on hop count alone.

Composite metrics accumulated by PING on its way along with the hop count would replace the discrete hop counts in RTs and FTs, providing for the above-mentioned alterations. These new RTs and subsequent FTs would contain much more granulated metrics, but the forwarding decisions are still to be made based on the quality of metric corresponding to the interfaces it is assigned to.

Figure 17:
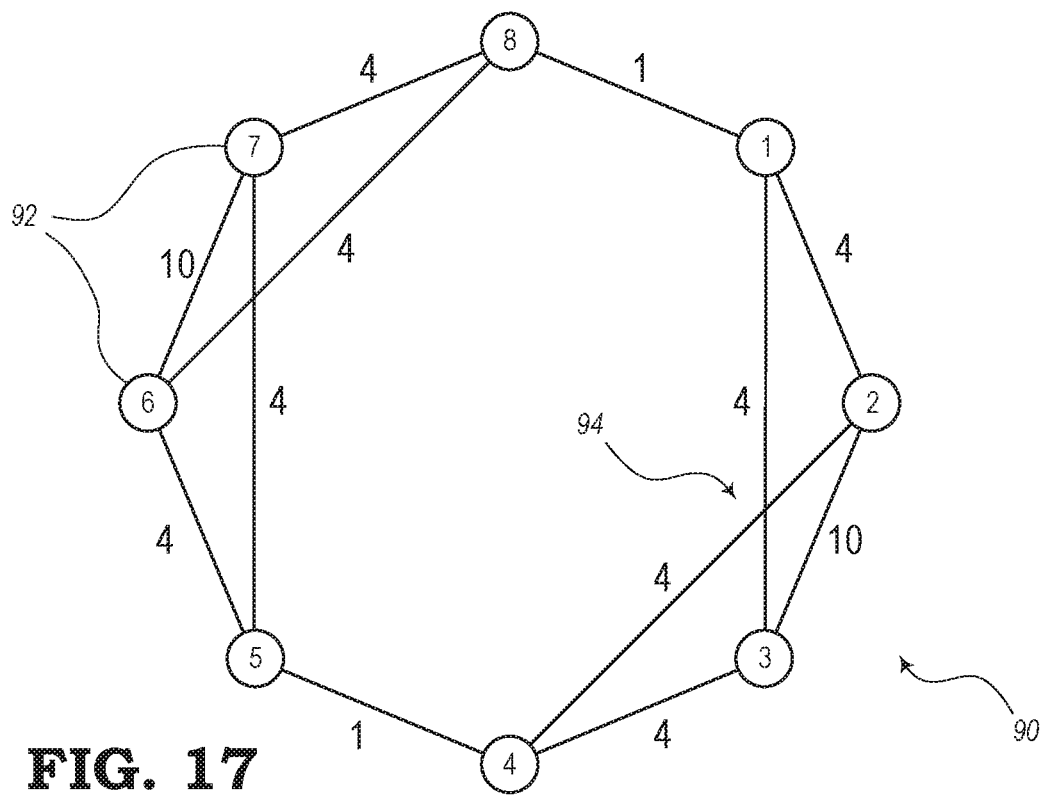
FIG. 17 is a schematic diagram illustrating switches arranged in the STRAT network architecture of FIG. 6 along with an updated, composite metric associated with the links of the network, according to various embodiments.
Figure 18A:
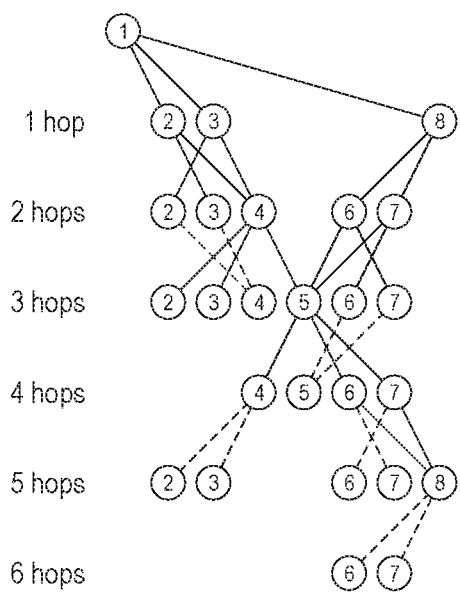
Figure 18B:
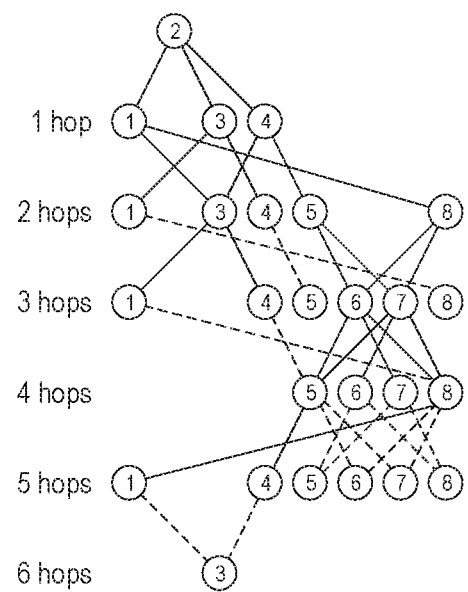
Figure 18C:
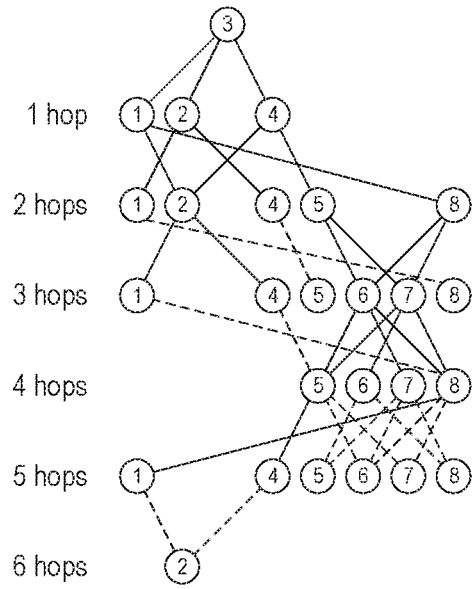
Figure 18D:
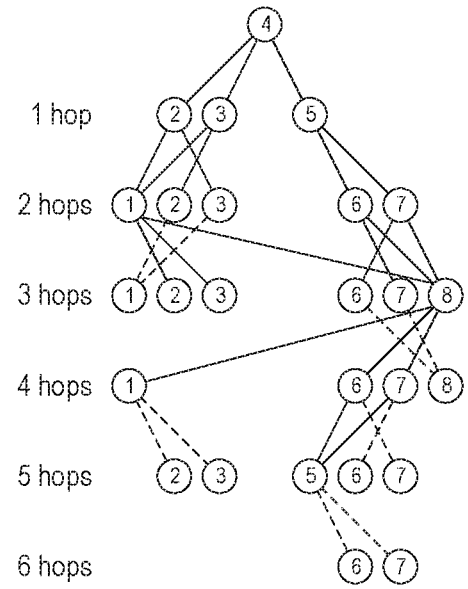
Figure 18E:
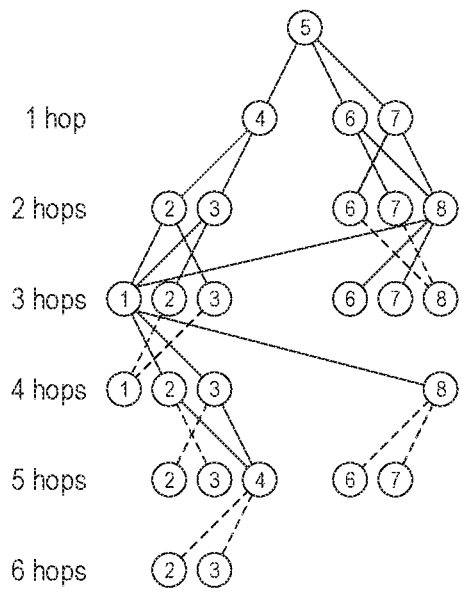
Figure 18F:
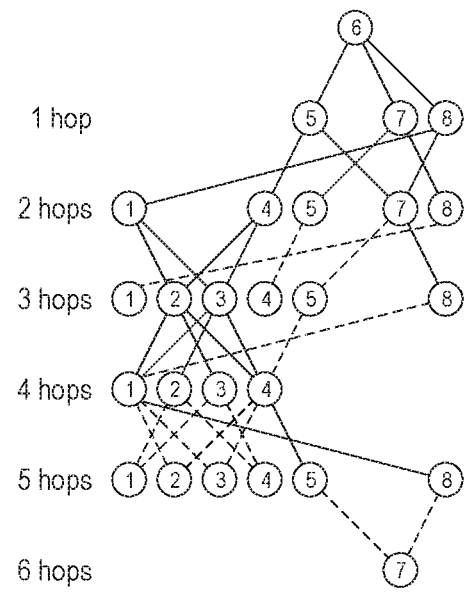

FIG. 17 is a diagram illustrating the switches 92 of the arrangement 90 of the STRAT network architecture shown in FIG. 6. Also shown is a composite metric (e.g., bandwidth) associated with the links between the switches 92 of the network. The metric (e.g., related to bandwidth) is shown along each of links 94 and is equal to 100G divided the actual bandwidth along the respective link 94. FIGS. 18A-18H are diagrams illustrating hop configurations for various source nodes of the STRAT network architecture of FIG. 17.

The PING algorithm with the composite metric is illustrated in FIG. 17, except in this case the link 94 between nodes 2 and 3 and the link 94 between nodes 6 and 7 each have 10G bandwidth (i.e., 100G/10G=10). The link 94 between nodes 1 and 8 and the link 94 between nodes 4 and 5 have 100G bandwidth (i.e., 100G/100G=1). The remaining links 94 in this example have 25G bandwidth (i.e., 100G/25G=4). The bandwidth-related metric is conventionally composed as inverse bandwidth with normalizing coefficient (e.g., a maximum bandwidth of 100G), producing the composite metric in integer format.

Thus, 10G, 25G and 100G links will have integer metrics of 10, 4 and 1 correspondingly, as illustrated in FIG. 17 by the metric numbers next to the links 94. The exemplary network of FIG. 17 can be envisioned as an undirected weighted graph with integer weights being a composite bandwidth related metric. It may be worth noting that this composite bandwidth related metric is automatically back-compatible with a simple hop-count-only metric when all the links 94 in the network become the same bandwidth.

FIG. 19 is a routing table 210 illustrating loop-less propagation along with this composite metric. To focus on the peculiarities of the composite metric (e.g., driven loop-less PING propagation), the propagation of a second node originated PING (i.e., PING2) may be considered. After a first hop, node 3 has its metric initiated to 10 through interface 1. After a second hop, the forwarding process gets a better metric of 8 through interfaces 2 and 3. This prompts the controller to store of better metric and discard any metric that is worse. This process illustrates the above-speculated occasion of prioritizing alternative two-hop routes through high-bandwidth interfaces based on metric value over a single hop through a low-bandwidth interface. This situation repeats in the process of updating the metric at node 2 by a third node originated PING (i.e., PING3), at node 7 by a sixth node originated PING (i.e., PING6) and at node 6 by a seventh node originated PING (i.e., PING7), in all cases assigning SP interfaces differently than in a previous case of the hop-count-only metric.

Besides the already analyzed phenomenon of node 3 metric updates by PING2, the second hop node 4 gets its metric on interface 2 initiated at 14 through the node chain 2→3→4. After that, on hop 3, this same metric on interface 3 is updated to 12 through the node chain 2→1→3→4. This prompts the storing of the better metric at interface 2 and discarding of the worse one. In this case, prioritizing an alternative three-hop route through high-bandwidth interfaces based on composite metric value over two hops through low-bandwidth interface is illustrated.

This situation repeats in the process of updating the metric at node 4 through interface 3 by PING3, at node 5 through interface 3 by PING6, and at node 5 through interface 2 by PING7. In these (and other) cases, contrary to the case of the hop-count-only metric, a lower metric is assigned to OSP2 interfaces and a higher metric is assigned to OSP1 interfaces. The resulting OSP RT is shown in the routing table 210 of FIG. 19. Granularity of composite metric ranges through 1, 4, 5, 8, 9, 10, 12, 14, 15, 17, and 19 compared to just 1, 2, 3, 4, and 5 in the previous case of the hop-count-only metric. Newly obtained SP entries to OSP RT are bolded in the routing table 210, OSP1 is shown in italics, OSP2 is underlined, and LR is bolded, italicized, and underlined.

The routing and forwarding algorithms described in the present disclosure extend EIGRP by computing more paths than would be computed with EIGRP's feasible next hops. However, the algorithms of the present disclosure guarantee loop-free paths. The infinite looping is avoided either by monitoring the TTL metric or by recording (in the data packet itself) the path along which the data packet will travel. For example, in TTL, an internal value may be set to the shortest path plus a variable number of hops (e.g., 2). Combined with poison-reverse, the present algorithms can guarantee no loops and have negligible impact on network bandwidth (e.g., loops may be formed by two hops around a triangle). Alternatively, if TTL is set to any value, the present algorithms may also be able to prevent loops by maintaining the in-packet record of visited nodes, and then preventing the visiting of an already-visited node.

One purpose for creating the loop-free routing algorithms described in the present disclosure is to provide solutions to infinite loop issues, particularly useful in active markets that include a large number of nodes. The network environment may include a richly meshed interconnection topology for limited inter-node delay. Examples of such markets include Inside Data Center, Internet of Things over a limited geography (e.g., at a sea port), access nodes at public spaces (e.g., a stadium), sensors and controllers scattered around a factory floor, etc.

Current algorithms in use have chiefly been developed for Wide Area Networks (WANs). These algorithms generally target networks with a large number of nodes, with long transmission delays between nodes, and potentially a large number of hops that packets take from source to destination.

The routing/forwarding algorithms of the present disclosure are configured for use inside a Data Center, with many functions stripped out to make them more lightweight. Nevertheless, the algorithms may still be generally targeted to structured networks, although of course EIGRP works over an arbitrary topology. However, conventional EIGRP may have a problem on highly meshed networks, where paths collapse to shortest only. Off-shortest paths may have intrinsic loops and are eliminated from Feasible Successors.

Other attempts (e.g., "SPAIN: COTS Data-Center Ethernet for Multipathing over Arbitrary Topologies") have been developed, but have issues dealing with a large number of nodes and paths, and issues with rapid congestion variation. For example, SPAIN normally requires a centralized controller to compute a large set of disjoint paths and map these into VLANs. End servers then choose a VLAN for a flow, but without congestion avoidance. Also, algorithms developed for ad-hoc wireless networks (Babel, etc.) have been considered, but these are typically optimized for networks with very rapid variability in nodal topology, and less focus on congestion avoidance, etc.

One of the goals of the embodiments of the present disclosure is to utilize a new range of highly programmable switch ASICs. The present embodiments may be able to leverage and benefit from these new levels of programmability inside the Data Center, IoT, etc.

An advantage of the embodiments described herein is that packet header "stamping" is inexpensive. Specifically, P4 provides very efficient methods for manipulating and extending packet metadata. Although the packet header look-up of "already-visited" nodes may be more expensive, it is still within the ASIC capability, such as by using P4 type Match/Action constructs, or possibly leveraging Content Addressable Memory (CAM). In cases where such programmability is expensive or unavailable, TTL can be introduced. However, in the present disclosure, default TTL is overwritten internal to the network with a Shortest+2 value, which guarantees no loops and no extra bandwidth consumption.

Another goal is to develop a protocol that is extremely lightweight and robust and specifically targets highly-meshed networks. This may provide low latency between nodes, even with an extremely large number of nodes. Also, this could be either a structured network or a mesh-like unstructured network. The protocol is also able to avoid local congestions and is decentralized and resilient to failures.

The forwarding tables described herein may be extremely compact and may be built within a number of clock cycles. Also, the forwarding tables are able to avoid issues associated with loops, count-to-infinity, split horizon complexity, etc. The forwarding tables may be very efficient in avoiding local hot spot congestions without any centralized control or knowledge.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A switch arranged in a network environment having a plurality of switches, the switch comprising:
   a plurality of inward-directed ports configured for direct connection with a plurality of servers;
   a plurality of outward-directed ports configured for direct connection with a subset of the plurality of switches;
   a processor configured to generate a Routing Table (RT) in an RT build process and to create a Forwarding Table (FT) for forwarding packets when the RT build process is complete; and a controller configured to store one or more of a Time-To-Live (TTL) count and a PathPort in each of the packets to be forwarded enabling the packets to be forwarded in a loop-free manner;
wherein the outward-directed ports are configured to forward packets to one or more switches of the subset of switches according to the FT;
wherein the FT includes at least a Shortest Path (SP) route and one or more Off-Shortest Path (OSP) routes for forwarding the packets to the one or more switches; and
wherein the Time-To-Live (TTL) count is equal to the SP route plus a predetermined number of hops, and wherein the PathPort includes a list of previously-visited nodes and the controller is configured to avoid forwarding packets to previously-visited nodes.

2. The switch of claim 1, wherein the network environment is a data center, network domain, Local Area Network (LAN), or enterprise network.

3. The switch of claim 1, wherein the network environment has a flat network architecture, the flat network architecture including an arrangement for interconnecting the plurality of switches in a single leaf layer.

4. The switch of claim 3, wherein the flat network architecture includes a structured, pseudo-random arrangement of switch interconnections with neither aggregation layer switches nor spine layer switches.

5. The switch of claim 1, wherein the one or more OSP routes include one or more re-route paths around congested network paths or defective network elements.

6. The switch of claim 1, wherein the processor is configured to construct the RT and FT in real time, and wherein the FT includes a hop metric from the switch to every destination.

7. The switch of claim 6, wherein the RT is constructed by sending Packet Initiated Network Generation (PING) packets from the plurality of outward-directed ports to neighboring switches, wherein the PING packets include an updated hop metric regarding instructions for forwarding packets to destination switches of the plurality of switches, and wherein the PING packets are appended with already-visited nodes to enable computation of an off-shortest hop count.

8. The switch of claim 1, wherein the RT is updated with time-stamps when changes to the network environment occur.

9. The switch of claim 1, wherein the RT includes metrics that are associated with congestion avoidance and are not associated with the knowledge of the loaded status of links beyond immediately adjacent links, thereby allowing forwarding decisions based on local load status before every hop toward a destination.

10. A computing system comprising:
a processing device associated with a switch of a plurality of switches in a network environment; and
a memory device configured to store a routing table building module that includes instructions configured to enable the processing device to forward packets within the network environment;
wherein the switch includes a plurality of inward-directed ports configured for direct connection with a plurality of servers, and the switch further includes a plurality of outward-directed ports configured for direct connection with a subset of the plurality of switches;
wherein the routing table building module is configured to enable the processing device to build a Routing Table (RT) defining how the switch forwards packets via the respective outward-directed ports, the RT including at least a Shortest Path (SP) route and one or more Off-Shortest Path (OSP) routes for forwarding the packets; and
wherein the network environment is a data center, network domain, Local Area Network (LAN), or enterprise network, and wherein the network environment includes a flat network architecture having a structured, pseudo-random arrangement of switch interconnections and having neither aggregation layer switches nor spine layer switches.

11. The computing system of claim 10, wherein the memory device further comprises a forwarding module configured to include forwarding instructions for forwarding packets throughout the network environment in a loop-free manner, the forwarding module utilizing at least one of a Time-To-Live (TTL) count and a PathPort, the TTL count being equal to the SP route plus a predetermined number of hops, and the PathPort including a list of previously-visited nodes to prevent forwarding packets to the previously-visited nodes.

12. The computing system of claim 10, wherein the processing device is configured to build the RT in real time to include a hop metric to every destination.

13. A non-transitory computer-readable medium configured to store software associated with a switch interconnected with a plurality of switches of a network environment, the software having instructions that, when executed, cause one or more processing devices within the switch to:
build a Routing Table (RT) having at least a Shortest Path (SP) route and one or more Off-Shortest Path (OSP) routes, the RT is built by sending Packet Initiated Network Generation (PING) packets to neighboring switches of the plurality of switches, wherein the PING packets include an updated ho metric regarding instructions for forwarding packets to destination switches of the plurality of switches, and wherein the PING packets are appended with already-visited nodes to enable computation of an off-shortest hop count;
make the RT available to the switch; and
instruct the switch to forward packets to destination switches of the plurality of switches according to the RT.

14. The non-transitory computer-readable medium of claim 13, wherein the network environment is a data center, network domain, Local Area Network (LAN), or enterprise network, and wherein the network environment includes a flat network architecture having a structured, pseudo-random arrangement of switch interconnections and having neither aggregation layer switches nor spine layer switches.

15. The non-transitory computer-readable medium of claim 13, wherein the instructions, when executed, further cause the one or more processing devices to utilize forwarding instructions for forwarding packets throughout the network environment in a loop-free manner, the forwarding instructions including decisions based on at least one of a Time-To-Live (TTL) count and a PathPort, the TTL count being equal to the SP route plus a predetermined number of hops, and the PathPort including a list of previously-visited nodes to prevent forwarding packets to previously-visited nodes.

* * * * *